US012699915B1

(12) United States Patent
Mukherjee et al.

(10) Patent No.: US 12,699,915 B1
(45) Date of Patent: Aug. 4, 2026

(54) SCALABLE QUANTUM ERROR CORRECTION ARCHITECTURE USING DUAL-FUNCTION TRANSMON COUPLERS IN A FLUXONIUM QUBIT ARRAY

(71) Applicant: QpiAI India Private Limited, Bangalore (IN)

(72) Inventors: Amlan Mukherjee, Bangalore (IN); Manjunath Ramachandrappa Venkatesh, Bangalore (IN); Nagendra Nagaraja, Bangalore (IN)

(73) Assignee: QpiAI India Private Limited, Bangalore (IN)

( * ) Notice: Subject to any disclaimer, the term of this patent is extended or adjusted under 35 U.S.C. 154(b) by 0 days.

(21) Appl. No.: 19/464,062

(22) Filed: Jan. 29, 2026

(30) Foreign Application Priority Data

Dec. 12, 2025 (IN) .............................. 202541125818

(51) Int. Cl.
*G06N 10/70* (2022.01)
*G06N 10/20* (2022.01)
(52) U.S. Cl.
CPC ............. *G06N 10/70* (2022.01); *G06N 10/20* (2022.01)
(58) Field of Classification Search
None
See application file for complete search history.

(56) References Cited

U.S. PATENT DOCUMENTS

| | | | | |
|---|---|---|---|---|
| 10,156,908 | B2 * | 12/2018 | Stafford | .................. G06F 3/014 |
| 11,658,660 | B1 * | 5/2023 | Finck | ..................... H10N 60/12 |
| | | | | 327/527 |
| 2023/0032766 | A1 * | 2/2023 | Neill | ...................... G06N 10/40 |
| 2024/0127100 | A1 * | 4/2024 | Kannan | ................... G06N 10/00 |
| 2024/0169232 | A1 * | 5/2024 | Finck | ..................... G06N 10/00 |

* cited by examiner

*Primary Examiner* — Jany Richardson
(74) *Attorney, Agent, or Firm* — Foley & Lardner LLP

(57) ABSTRACT

A system for quantum error correction can store quantum information while supporting controlled interactions for syndrome measurements. The system includes a plurality of fluxonium qubits arranged as data qubits. The system further includes a plurality of transmon qubits arranged as ancilla qubits, each positioned between a respective first fluxonium qubit and a respective second fluxonium qubit. The system further includes, for each transmon qubit, a tunable coupling element connected between the first and second fluxonium qubits. The system further includes a coupling control circuit connected to each tunable coupling element, the coupling control circuit configured to set a desired coupling strength during active operations and to increase the impedance state during idle periods to isolate the fluxonium qubits from residual interactions, thereby improving coherence times and reducing error rates in quantum computation.

18 Claims, 6 Drawing Sheets

100

FIG. 1

400

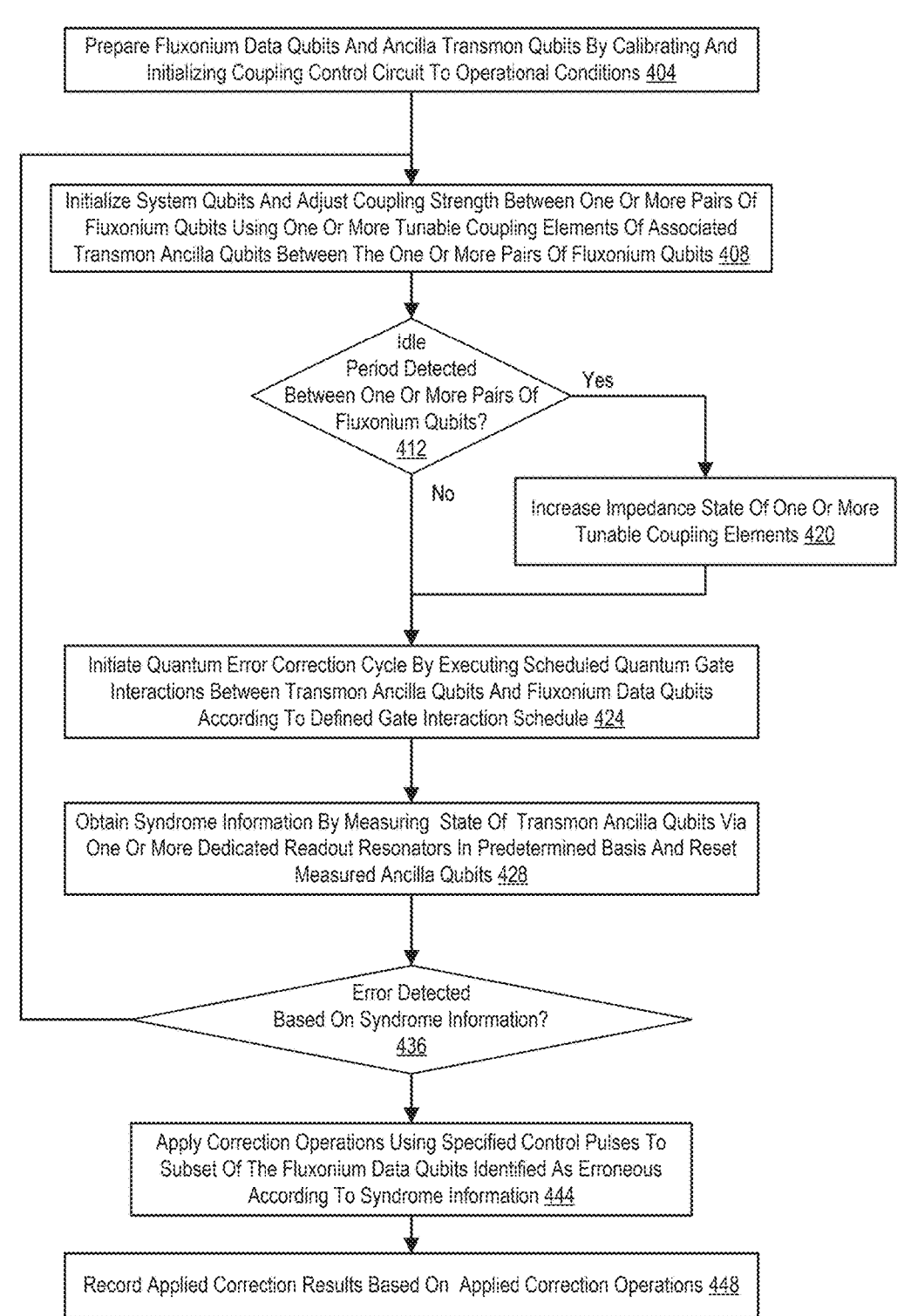

Prepare Fluxonium Data Qubits And Ancilla Transmon Qubits By Calibrating And Initializing Coupling Control Circuit To Operational Conditions 404

Initialize System Qubits And Adjust Coupling Strength Between One Or More Pairs Of Fluxonium Qubits Using One Or More Tunable Coupling Elements Of Associated Transmon Ancilla Qubits Between The One Or More Pairs Of Fluxonium Qubits 408

Idle Period Detected Between One Or More Pairs Of Fluxonium Qubits? 412

Yes

No

Increase Impedance State Of One Or More Tunable Coupling Elements 420

Initiate Quantum Error Correction Cycle By Executing Scheduled Quantum Gate Interactions Between Transmon Ancilla Qubits And Fluxonium Data Qubits According To Defined Gate Interaction Schedule 424

Obtain Syndrome Information By Measuring State Of Transmon Ancilla Qubits Via One Or More Dedicated Readout Resonators In Predetermined Basis And Reset Measured Ancilla Qubits 428

Error Detected Based On Syndrome Information? 436

Apply Correction Operations Using Specified Control Pulses To Subset Of The Fluxonium Data Qubits Identified As Erroneous According To Syndrome Information 444

Record Applied Correction Results Based On Applied Correction Operations 448

FIG. 4

600

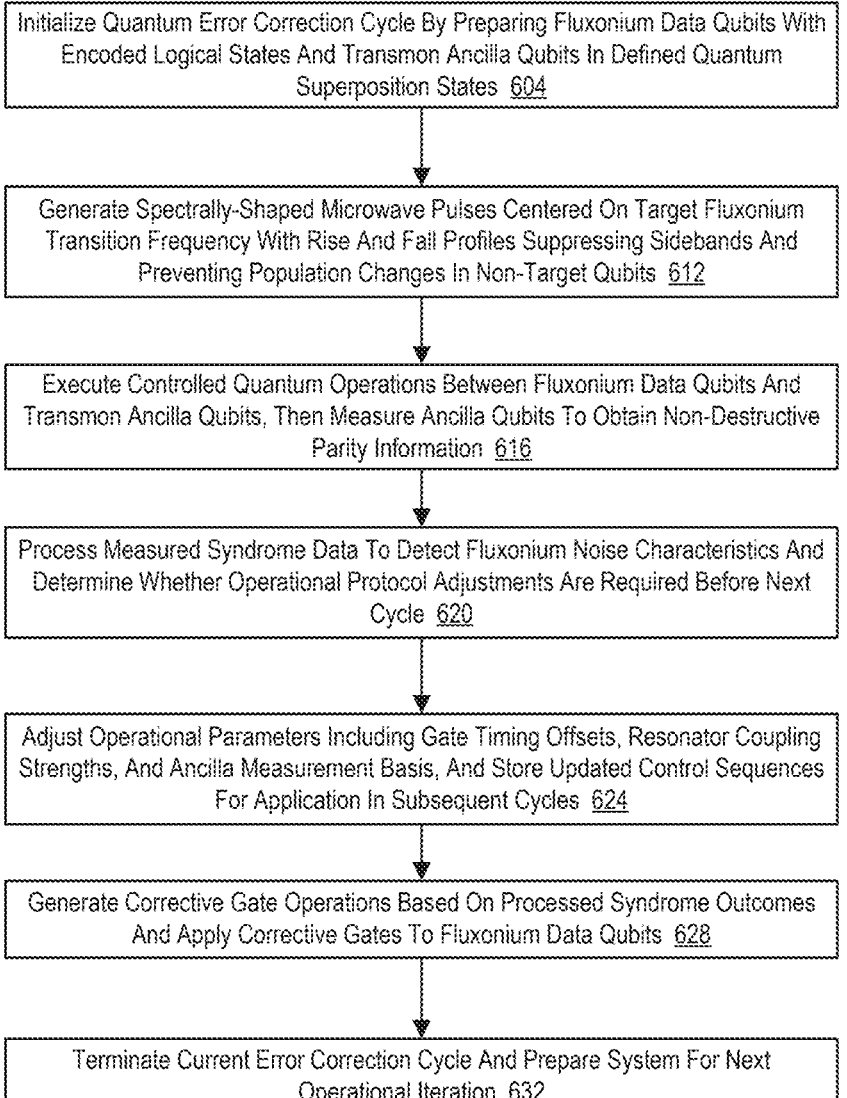

Initialize Quantum Error Correction Cycle By Preparing Fluxonium Data Qubits With Encoded Logical States And Transmon Ancilla Qubits In Defined Quantum Superposition States 604

Generate Spectrally-Shaped Microwave Pulses Centered On Target Fluxonium Transition Frequency With Rise And Fall Profiles Suppressing Sidebands And Preventing Population Changes In Non-Target Qubits 612

Execute Controlled Quantum Operations Between Fluxonium Data Qubits And Transmon Ancilla Qubits, Then Measure Ancilla Qubits To Obtain Non-Destructive Parity Information 616

Process Measured Syndrome Data To Detect Fluxonium Noise Characteristics And Determine Whether Operational Protocol Adjustments Are Required Before Next Cycle 620

Adjust Operational Parameters Including Gate Timing Offsets, Resonator Coupling Strengths, And Ancilla Measurement Basis, And Store Updated Control Sequences For Application In Subsequent Cycles 624

Generate Corrective Gate Operations Based On Processed Syndrome Outcomes And Apply Corrective Gates To Fluxonium Data Qubits 628

Terminate Current Error Correction Cycle And Prepare System For Next Operational Iteration 632

FIG. 6

SCALABLE QUANTUM ERROR CORRECTION ARCHITECTURE USING DUAL-FUNCTION TRANSMON COUPLERS IN A FLUXONIUM QUBIT ARRAY

CROSS-REFERENCE TO RELATED APPLICATIONS

The application claims the benefit of priority to Indian Provisional Application No.: 202541125818, filed Dec. 12, 2025, the entirety of which is incorporated by reference herein.

BACKGROUND

Quantum computing is an approach to computation that applies quantum mechanical principles to represent and manipulate information using quantum bits, or qubits. Unlike classical bits that exist in a state of 0 or 1, qubits can exist in superposition, holding combinations of states simultaneously, and can become entangled to enable highly correlated operations. Coherence refers to the ability of a qubit to maintain its quantum state over time without being disrupted by environmental noise or unintended interactions. Long coherence times allow quantum operations to occur with high fidelity before quantum information decays or becomes corrupted, impacting the scalability and error tolerance of a quantum computer.

SUMMARY

Many quantum systems often suffer from coherence issues, high crosstalk, or complex fabrication issues, which can limit reliability and scalability of quantum operations. Fluxonium and transmon qubits are two superconducting qubit architectures that offer distinct advantages in coherence time, gate speed, and noise resilience. Combining these two types of qubits into a hybrid system can offer significant advantages in improving quantum coherence.

Some embodiments can incorporate a plurality of fluxonium qubits arranged as data qubits and a plurality of transmon qubits arranged as ancilla qubits. Some embodiments can position a first transmon qubit between a first fluxonium qubit and a second fluxonium qubit. Some embodiments can include a readout resonator and a tunable coupling element as part of the first transmon qubit. Some embodiments can then connect the tunable coupling element between the first fluxonium qubit and the second fluxonium qubit. The tunable coupling element can be connected to a coupling control circuit that controls the coupling strength between the first fluxonium qubit and the second fluxonium qubit and increases an impedance state of the tunable coupling element during an idle period between the first fluxonium qubit and the second fluxonium qubit.

By using the system and performing related operations described in this disclosure, some embodiments can physically separate data storage and error syndrome extraction by assigning fluxonium qubits for quantum data retention and transmon qubits for fast, high-fidelity measurement. Some embodiments can enable hardware-level control over qubit interactions by introducing a tunable coupling element managed by a control circuit, minimizing unwanted crosstalk and maintaining qubit coherence during idle periods. Some embodiments can improve measurement reliability and system scalability by integrating a respective readout resonator with each transmon ancilla, enhancing hardware efficiency for modular quantum error correction architectures.

Various other aspects, features, and advantages of the invention will be apparent through the detailed description of the invention and the drawings attached hereto. It is also to be understood that both the foregoing general description and the following detailed description are examples and are not restrictive of the scope of the invention.

BRIEF DESCRIPTION OF THE DRAWINGS

FIG. 1 shows a system for quantum error correction, in accordance with some embodiments.

FIG. 4 shows flowchart of a process for operating a hybrid fluxonium-transmon-fluxonium quantum system for quantum error correction, in accordance with one or more embodiments.

FIG. 6 shows a flowchart of a process to implement hardware-efficient quantum error correction in a fluxonium-transmon architecture, in accordance with one or more embodiments.

Figure 2:
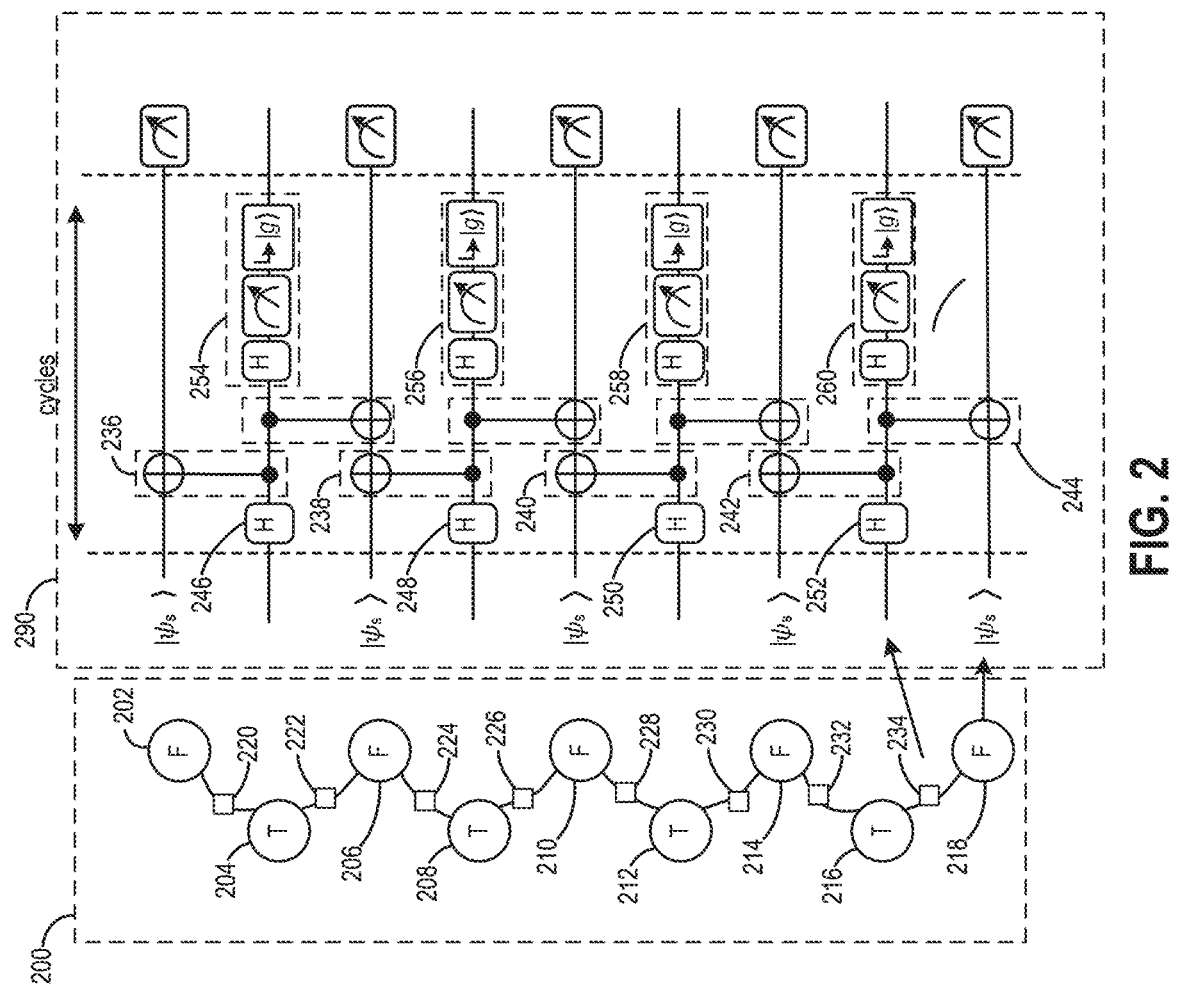
FIG. 2 shows a quantum error correction cycle sequence for a hybrid qubit architecture incorporating fluxonium data qubits and transmon ancilla qubits, in accordance with one or more embodiments.

The technologies described herein will become more apparent to those skilled in the art by studying the detailed description in conjunction with the drawings. Embodiments of implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

In the following description, for the purposes of explanation, numerous specific details are set forth in order to provide a thorough understanding of the embodiments of the invention. It will be appreciated, however, by those having skill in the art that the embodiments of the invention can be practiced without these specific details or with an equivalent arrangement. In other cases, well-known structures and devices are shown in block diagram form in order to avoid unnecessarily obscuring the embodiments of the invention.

Quantum computing is a field of information processing that uses quantum bits, or qubits, to store and manipulate information according to the principles of quantum mechanics. Unlike classical bits that exist strictly as 0 or 1, qubits can exist in superpositions of states, enabling the representation and processing of far more complex data spaces. Qubits can also become entangled, meaning the state of one qubit is strongly correlated with the state of another, allowing computational operations that have no classical equivalent. These properties give quantum computers the potential to solve certain problems exponentially faster than classical systems, including tasks such as molecular simulation, advanced optimization, and factoring large numbers. However, qubits are fragile and can be prone to errors due to decoherence from environmental noise, control signal imperfections, and unwanted coupling to other elements in the system. Moreover, different qubits can exhibit different strengths and drawbacks. For example, fluxonium qubits can exhibit superior coherence properties (by having longer energy relaxation times ($T_1$) and coherence times ($T_2$)) but face challenges in reliable control and readout. Similarly, while transmon qubits offer ease of control and measurement, transmon qubits can suffer from shorter coherence times.

Quantum error correction is a critical enabling technology for scalable quantum computing. It allows logical information to be encoded across multiple physical qubits in a way that detects and corrects certain types of quantum errors without destroying the quantum information. By measuring carefully chosen ancilla qubits in specific interaction patterns with data qubits, an error syndrome can be extracted that reveals whether and where an error occurred. Correction operations can then be applied before the error propagates. Without quantum error correction, large-scale algorithms would fail due to accumulated noise long before completion. As quantum processors grow to hundreds or thousands of physical qubits, maintaining a low enough logical error rate through repeated error detection and correction cycles becomes essential.

As described in this disclosure, a hybrid fluxonium-transmon qubit arrangement can provide a practical superconducting quantum processor architecture that increases the likelihood of effective quantum error correction while minimizing hardware complexity. In some embodiments, a plurality of fluxonium qubits can serve as data qubits due to their high inductance elements and superior energy relaxation times ($T_1$) and phase coherence times ($T_2$). In some embodiments, a plurality of transmon qubits can serve as ancilla qubits and can be associated with respective tunable coupling elements for selectively coupling the fluxonium qubits during active gate operations for syndrome extraction and entanglement. In some embodiments, the transmon qubits described in this disclosure can be used as ancilla qubits for error correction or be used as tunable couplers, where the transmon qubits can serve in these separate roles during separate operational cycles. Furthermore, a tunable coupler can include one or more tunable coupling elements, such as a flux-tunable SQUID loop formed by Josephson junctions. The use of both the fluxonium qubits and the transmon qubits in such a hybrid architecture can reduce parasitic coupling effects between qubits, thereby making the hybrid architecture well-suited to implementing efficient, high-fidelity quantum error correction routines in scalable superconducting quantum processors. Furthermore, because the transmon qubits can provide superior syndrome extraction capabilities relative to the fluxonium qubits, the hybrid fluxonium-transmon qubit system can provide quantum computing operations that are more reliable and more controllable.

For example, a hybrid system can include a plurality of fluxonium qubits arranged as data qubits for storing quantum information and a plurality of transmon qubits arranged as ancilla qubits. For each respective transmon qubit of the plurality of transmon qubits, the respective transmon qubit can be positioned between a respective first fluxonium qubit of the plurality of fluxonium qubits and a respective second fluxonium qubit of the plurality of fluxonium qubits. Each respective transmon qubit can serve as a respective tunable coupler and can include a respective tunable coupling element connected between the respective first fluxonium qubit and the respective second fluxonium qubit. The tunable coupling element of each respective transmon qubit can be connected to a respective coupling control circuit that controls a coupling strength between the respective first fluxonium qubit and the respective second fluxonium qubit during active gate execution. The respective control circuit can increase an impedance state of the respective tunable coupling element during an idle period between the respective first fluxonium qubit and the respective second fluxonium qubit to isolate the plurality of fluxonium qubits from residual interactions in the idle period.

In some embodiments, fluxonium qubits can provide long coherence times due to high inductance elements such as nanowire arrays or super inductors, making them effective as data qubits in error correction codes. A transmon qubit can serve as an ancilla qubit and can include or be connected to components that allow the transmon qubit to serve as or influence tunable coupling elements with multi-junction elements, such as split-junction configurations that allow precise control via increases in applied magnetic flux. Coupling control circuits linked to each tunable coupling element can dynamically adjust coupling strengths during active gate operations, enabling resonator-mediated or capacitive gates for syndrome extraction, and then raise impedance states during idle periods to achieve complete qubit isolation. The architecture co-fabricates both qubit types on a common substrate using a multi-layer aluminum deposition process where controlled oxidation defines Josephson junctions for both qubit types in a single lithography mask set. This integration ensures uniform fabrication parameters across data and ancilla qubits, minimizes alignment errors, and reduces hardware overhead.

By using the positional arrangement of each ancilla transmon qubit between two fluxonium data qubits, some embodiments can ensure consistent interaction geometry. Each ancilla transmon qubit can include a dedicated tunable coupling element with an associated coupling control circuit. The coupling control circuit adjusts the coupling strength between respective fluxonium qubit pairs during active gate operations. The coupling control circuit can also increase the impedance state of the tunable coupling element during idle periods to isolate the plurality of fluxonium qubits from residual interactions. The hybrid fluxonium-transmon qubit system increases the likelihood of achieving high-fidelity quantum error correction by combining precise interaction control with strong idle-state isolation. The design leverages the noise resilience of fluxonium qubits and the coupling tunability of multi-junction transmon elements. The hybrid fluxonium-transmon qubit system can provide quantum computing hardware capable of meeting the operational demands of large-scale, fault-tolerant quantum processors.

FIG. 1 shows a system 100 for quantum error correction, in accordance with some embodiments. The system 100 can be a quantum system for quantum error correction that employs a hybrid qubit architecture using the complementary properties of a plurality of fluxonium qubits 120 and a plurality of transmon qubits 110. The plurality of fluxonium qubits 120 are designated as data qubits, arranged to store quantum information with reduced susceptibility to noise due to their long coherence times. The plurality of fluxonium qubits 120 are organized spatially along the architecture such that each respective fluxonium qubit can interact with one or more qubits of the plurality of transmon qubits 110 without unnecessary crosstalk. For example, a respective transmon qubit 111 is positioned between a first fluxonium qubit 122 and a respective second fluxonium qubit 124. The plurality of fluxonium qubits 120 form the primary repository of logical states that require protection against bit-flip and phase-flip errors through active error correction cycles.

The plurality of transmon qubits 110 in the system can function as ancilla qubits to assist in syndrome extraction during quantum error correction. Each respective transmon qubit of the plurality of transmon qubits 110 can be physically positioned between a respective first fluxonium qubit and a respective second fluxonium qubit. This configuration permits each transmon qubit of the plurality of transmon qubits 110 to mediate controlled interactions between its neighboring fluxonium qubits of the plurality of fluxonium qubits 120 to detect correlated errors. Furthermore, such a configuration supports direct resonator-mediated or capacitive coupling for gate operations, such as a set of controlled-NOT gate operations 108. Such a configuration can enable controlled-NOT or related entangling gates that encode error information into the state of the plurality of transmon qubits 110. By using a respective transmon qubit of the plurality of transmon qubits 110 between a respective first fluxonium qubit and a respective second fluxonium qubit of the plurality of fluxonium qubits 120, some embodiments can simplify interaction pathways and reduced hardware overhead compared to more complex multi-level coupling schemes.

Each respective transmon qubit of the plurality of transmon qubits 110 includes a respective tunable coupling element of a plurality of tunable coupling elements connected between the neighboring fluxonium qubits of the plurality of fluxonium qubits 120. The plurality of tunable coupling elements of the plurality of transmon qubits 110 act as adjustable control points for the quantum linkage, allowing fine-grained variation in the coupling strength to suit operational phases of the error correction cycle. During active gate operations, the plurality of tunable coupling elements of the plurality of transmon qubits 110 108 can be configured to maximize fidelity of state transfer and entanglement generation. The tunable nature permits dynamic changes to physical coupling parameters, which can improve error detection sensitivity and reduce residual couplings that can persist outside of intended operation sequences.

The plurality of tunable coupling elements of the plurality of transmon qubits 110 are connected to a plurality of coupling control circuits, where each respective tunable coupling element of the plurality of tunable coupling elements of the plurality of transmon qubits 110 can be connected to a respective coupling control circuit of the plurality of coupling control circuits. In some embodiments, a coupling control circuit of the plurality of coupling control circuits can actively control the coupling strength between the respective fluxonium qubits of the plurality of fluxonium qubits 120 during scheduled interactions. Furthermore, a coupling control circuit of the plurality of coupling control circuits can increase the impedance of a tunable coupling element of The plurality of tunable coupling elements of the plurality of transmon qubits 110 during idle periods between the respective fluxonium qubits of the plurality of fluxonium qubits 120. In some embodiments, a respective circuit of the plurality of coupling control circuits can include a respective flux bias line of a plurality of flux bias lines, where the respective flux bias line is configured to apply a magnetic flux to a respective tunable coupling element of the plurality of tunable coupling elements of the plurality of transmon qubits 110. This applied magnetic flux can switch the respective tunable coupling element into a high impedance state during the idle period, thereby isolating a respective fluxonium qubit of the plurality of fluxonium qubits 120 from residual interactions and preserving the encoded quantum state integrity.

The system 100 includes a set of control processors 150 connected to each respective coupling control circuit of the plurality of coupling control circuits. The set of control processors 150 can execute stored control instructions to adjust the activation timing of a respective tunable coupling element of the plurality of tunable coupling elements 108 based on prior measurement outcomes obtained from a respective transmon qubit. The connection of the set of control processors 150 to the plurality of coupling control circuits enables an adaptive operational mode where historical syndrome data inform real-time coupling adjustments, allowing the architecture to optimize interaction intervals for each ancilla-data qubit pair. By factoring in previously measured error patterns, the set of control processors 150 can shorten or extend active coupling phases, adjust impedance transition rates, and synchronize control pulse delivery with the measurement-and-reset cycle to further improve error correction efficiency.

In some embodiments, the set of control processors 150 can be integrated with a set of readout resonators 130 of the plurality of fluxonium qubits 120. The set of control processors 150 can include signal processing hardware, enabling a closed-feedback loop between measurement results and coupling control system parameters. The integration of the set of control processors 150 with the set of readout resonators 130 and signal processing hardware can integrate fluxonium data qubits, transmon ancilla qubits, tunable coupling elements, coupling control circuits, and flux bias lines to create a responsive, hardware-efficient quantum processor with high cycle repeatability, reduced idle leakage, and adaptive interaction scheduling. It should be understood that, while some embodiments are described with tunable resonators, some embodiments can implement resonators that are not tunable.

It should be understood the system 100 can be extended to form a linear chain of N fluxonium qubits serving as data qubits with N−1 transmon qubits positioned between adjacent fluxonium qubits to function as syndrome extractors, where Nis any integer greater than one. Such a configuration can protect against either bit-flip or phase-flip errors, depending on the basis chosen for encoding. Furthermore, it should be understood that, while the system 100 shows the fluxonium qubits in a linear structure, other geometries are possible. For example, the array of fluxonium qubits can be positioned in a two-dimensional lattice array, where the transmon qubits can be positioned at the vertices of the two-dimensional lattice array. The two-dimensional lattice structure of the plurality of fluxonium qubits and the plurality of transmon qubits can enable the implementation of the rotated surface code that can protect against both bit-flip and phase-flip errors simultaneously. Furthermore, other two-dimensional arrangements of fluxonium qubits can be used, such as a hexagonal array of fluxonium qubits, or other arrangements in which transmon qubits can be positioned adjacent to the fluxonium qubits. The use of a resonator-mediated coupling scheme enables various forms of controlled interactions between fluxonium data qubits and transmon ancilla qubits. In such systems, dedicated microwave control lines and readout resonators can be used to configure and use the hybrid qubit architecture to correct errors and perform various quantum computing tasks.

FIG. 2 shows a quantum error correction cycle sequence for a conceptual circuit architecture 200 incorporating fluxonium data qubits and transmon ancilla qubits, in accordance with one or more embodiments. The fluxonium qubits and transmon qubits are interconnected through tunable coupling elements, controlled via entangling gates, hybrid interactions, ancilla reset procedures, and measurement outputs to form repetition code. The arrangement can run in repeated cycles to detect, isolate, and correct correlated quantum errors while preserving coherence in fluxonium data qubits.

The conceptual circuit architecture 200 includes a first fluxonium qubit 202, a second fluxonium qubit 206, a third fluxonium qubit 210, a fourth fluxonium qubit 214, and a fifth fluxonium qubit 218. The conceptual circuit architecture 200 further includes, coupled to at least one of the fluxonium qubits, a set of transmon qubits that includes a first transmon qubit 204, a second transmon qubit 208, a third transmon qubit 212, a fourth transmon qubit 216. The conceptual circuit architecture 200 further includes a first tunable coupling element 220, a second tunable coupling element 222, a third tunable coupling element 224, a fourth tunable coupling element 226, a fifth tunable coupling element 228, and a sixth tunable coupling element 230. In some embodiments, the second tunable coupling element 222, the third tunable coupling element 224, the fourth tunable coupling element 226, the fifth tunable coupling element 228, and the sixth tunable coupling element 230 can be implemented as controlled-NOT gates or controlled-Z gate (CZ).

The first fluxonium qubit 202 acts as a data qubit and connects to the first transmon qubit 204, functioning as an ancilla qubit, through the first tunable coupling element 220. The first transmon qubit 204 connects to the second fluxonium qubit 206 through the second tunable coupling element 222, establishing a measurement interaction pathway across two neighboring fluxonium qubits. The second fluxonium qubit 206 connects to the second transmon qubit 208 using the third tunable coupling element 224, while the second transmon qubit 208 links to the third fluxonium qubit 210 through the fourth tunable coupling element 226. The third fluxonium qubit 210 connects to the third transmon qubit 212 through the fifth tunable coupling element 228, which in turn couples to the fourth fluxonium qubit 214 via the sixth tunable coupling element 230. The fourth fluxonium qubit 214 connects to the fourth transmon qubit 216 through the seventh tunable coupling element 232, and the fourth transmon qubit 216 connects to the fifth fluxonium qubit 218 using the eighth tunable coupling element 234. The alternating placement of fluxonium qubits and transmon qubits can minimize crosstalk while enabling direct syndrome extraction between each ancilla and its neighboring data qubits.

A cycle diagram 290 shows a conceptual timelapse of events for operational cycles of the qubits shown in the conceptual circuit architecture 200. The cycle diagram 290 shows entangling gates executing a first controlled-NOT or controlled-Z gate operation 236 between first fluxonium qubit 202 and first transmon qubit 204, second controlled-NOT or controlled-Z gate operation 238 between the second fluxonium qubit 206 and the second transmon qubit 208, a third controlled-NOT or controlled-Z gate operation 240 between the third fluxonium qubit 210 and the third transmon qubit 212, a fourth controlled-NOT or controlled-Z gate operation 242 between the fourth fluxonium qubit 214 and the fourth transmon qubit 216, and a fifth controlled-NOT gate operation 244 between the fifth fluxonium qubit 218 and the fourth transmon qubit 216 for a parity check across a shared ancilla. The gates for these gate operations can encode the parity information from data qubits into the states of ancilla transmon qubits without collapsing the logical states stored in fluxonium qubits.

Following the initial operations of the entangling gates, syndrome extraction operations occur via hybrid fluxonium-transmon interactions. A first hybrid interaction 246 implements an interaction governed by a specific interaction Hamiltonian between the first fluxonium qubit 202 and the first transmon qubit 204. A second hybrid interaction 248 implements an interaction governed by a specific interaction Hamiltonian between the second fluxonium qubit 206 and the second transmon qubit 208. A third hybrid interaction 250 implements an interaction governed by a specific interaction Hamiltonian between the third fluxonium qubit 210 and the third transmon qubit 212. A fourth hybrid interaction 252 implements an interaction governed by a specific interaction Hamiltonian between the fourth fluxonium qubit 214 and the fourth transmon qubit 216. The first hybrid interaction 246, the second hybrid interaction 248, the third hybrid interaction 250, and the fourth hybrid interaction 252 can each correlate the phase information and amplitude information of the respective fluxonium data qubits into the corresponding transmon ancilla qubits for later measurement in subsequent quantum error correction cycles.

Once syndrome information is transferred during the hybrid interactions, each transmon ancilla qubit can undergo a dedicated ancilla reset operation to prepare the transmon ancilla qubit for the next quantum error correction cycle. A first ancilla reset 254 can return the first transmon qubit 204 to the ground state |g>. Similarly, a second ancilla reset 256 can return the second transmon qubit 208 to |g>, a third ancilla reset 258 can return the third transmon qubit 212 to |g>, and a fourth ancilla reset 260 can return the fourth transmon qubit 216 to |g>. Such operations can reduce the risk of residual quantum states persisting, thereby reducing the risk of residual states distorting future syndrome measurements.

Each cycle can also include operations to perform readout operations. A first transmon measurement operation collects the output state of first transmon qubit 204 for processing, a second transmon measurement operation collects the output state of second transmon qubit 208, a third transmon measurement operation collects the output state of third transmon qubit 212, a fourth transmon measurement operation collects the output state of fourth transmon qubit 216, and a fifth transmon measurement operation collects the output state of fourth transmon qubit 216. The control system evaluates all measurement results to determine error syndromes and implements corrective gates on fluxonium data qubits in subsequent cycles where necessary.

Each cycle thus starts with targeted entangling gates to encode error information, follows with hybrid interactions to transfer syndrome data, proceeds to ancilla resets to maintain measurement fidelity, and concludes with readouts for error detection. The operational cycles of the conceptual circuit architecture 200 can execute sequentially and repeatedly, enabling real-time adaptive correction that increases the likelihood of preserving logical quantum states stored in fluxonium qubits while minimizing overhead through direct, local interactions mediated by tunable coupling elements.

Figure 3:
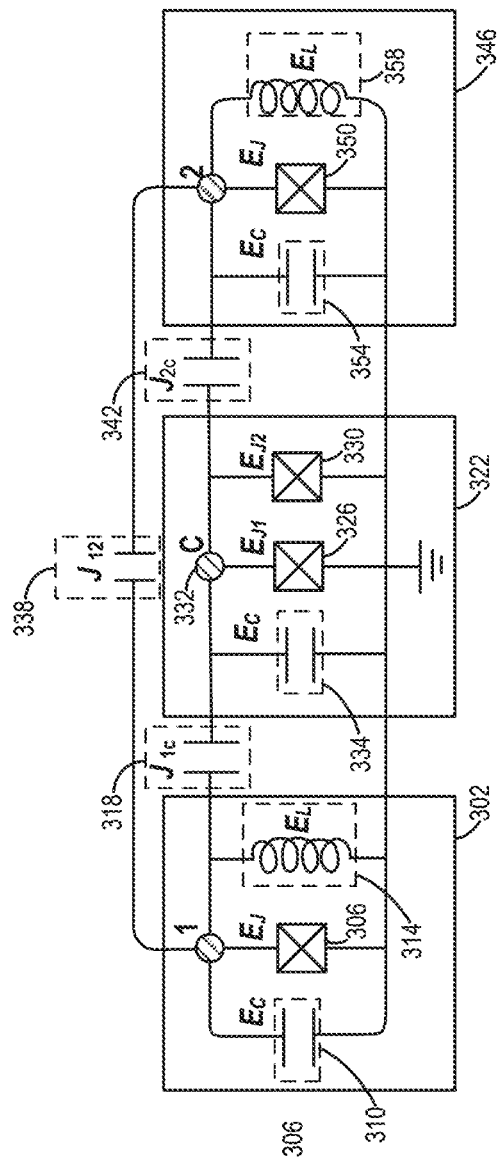
FIG. 3 shows a conceptual circuit architecture of a coupled set of fluxonium data qubits and transmon ancilla qubits, in accordance with some embodiments.

FIG. 3 shows a conceptual circuit architecture 300 of a coupled set of fluxonium data qubits and transmon ancilla qubits, in accordance with some embodiments. The conceptual circuit architecture 300 includes a tunable coupling assembly where a first fluxonium qubit 302 and a second fluxonium qubit 346 are interconnected through a transmon coupler qubit 322. In some embodiments, the combination of the first fluxonium qubit 302, the transmon coupler qubit 322, the second fluxonium qubit 346, and related components can be described forming a tunable coupling assembly. A tunable coupling assembly can include a complete inter-qubit connection pathway that links two fluxonium qubits and a tunable coupler positioned between them, the tunable coupling element(s) contained within that tunable coupler, and any interface hardware such as capacitive links or resonators at the qubit endpoints. The tunable coupling assembly allows for precise control over the interaction between the fluxonium data qubits by adjustments to the impedance state of one or more tunable coupling elements via magnetic flux increase. The tunable coupling assembly supports high-fidelity entangling gate operations when in a low-impedance coupling state and strong qubit isolation during an idle period when in a high-impedance state. Such control provides an effective balance between operational flexibility and error suppression, an important feature in hybrid quantum processors targeting reduced hardware overhead and minimized crosstalk.

First fluxonium qubit 302 includes first fluxonium qubit Josephson junction 306, which defines the Josephson energy EJ of the device and determines its anharmonic potential used for qubit state manipulation. First fluxonium qubit capacitor 310 sets the charging energy EC and is typically designed with large capacitor pads fabricated from low-loss superconducting materials to reduce dielectric decoherence. A first fluxonium qubit inductor 314 is a high-value super-inductor providing inductive energy EL, which contributes to the fluxonium's low susceptibility to flux noise. The first port connected to the first fluxonium qubit interfaces with first fluxonium-coupler capacitive connection J1c 318, forming one endpoint of a tunable coupling assembly that can include the transmon coupler qubit 322. The first fluxonium-coupler capacitive connection J1c 318 can operate in reso-nator-mediated mode where a microwave signal path between the first port and the transmon coupler qubit delivers controlled interactions. For example, during a controlled-NOT gate execution, the first fluxonium-coupler capacitive connection J1c 318 can be tuned through coupling strengths around 20 MHz for a 50 nanoseconds (ns) interaction window.

The transmon coupler qubit 322 contains a first transmon coupler Josephson junction 326 and a second transmon coupler Josephson junction 330 mounted in a split-junction configuration. The split-junction geometry of the first trans-mon coupler Josephson junction 326 and the second trans-mon coupler Josephson junction 330 permits modulation of the coupler's resonance frequency by applying a magnetic flux increase through a dedicated flux bias line 332. The transmon coupler capacitor 334 adjusts the charging energy, typically in the range of 200-250 MHz for separation from fluxonium operating frequencies. A central resonator, rep-resented by a first transmon-fluxonium shared coupling element 338, can connect the first port connected to the first fluxonium qubit with the second port connected to the second fluxonium qubit. The resonator can facilitate capaci-tive or inductive coupling depending on the target gate type. For example, the first transmon-fluxonium shared coupling element 338 might operate at 5.5 GigaHertz (GHz) and be brought into resonance with the fluxonium qubits during controlled phase operations, then detuned to 6.5 GHz to prevent unintended interactions. The second port connected to the second fluxonium qubit links through a second fluxonium-coupler capacitive connection J2c 342 with simi-lar coupling properties as the first fluxonium-coupler capaci-tive connection J1c 318. In some embodiments, a second fluxonium qubit 346 can mirror the construction of the first fluxonium qubit 302, with second fluxonium qubit Joseph-son junction 350 defining a Josephson energy of the second fluxonium qubit 346, a second fluxonium qubit capacitor 354 setting the charging energy, and a second fluxonium qubit inductor 358 providing the inductive energy necessary for fluxonium operation stability.

During active gate operation execution, control electron-ics apply a magnetic flux increase to the transmon coupler qubit 322 to bring the resonance frequency of the transmon coupler qubit 322 to be near or equal to the midpoint between the frequency of the first fluxonium qubit 302 and the second fluxonium qubit 346. This adjustment lowers the impedance state of a tunable coupling element comprising the first transmon coupler Josephson junction 326 and the second transmon coupler Josephson junction 330. Lowering the impedance state of the tunable coupling element can increase state transfer or entangling gate fidelity. For example, a magnetic flux tuning from 0.1 to 0.25 flux quanta could shift the coupler's frequency by approximately 250 MHz, enabling alignment with the resonator's passband for a 100 nanosecond (ns) controlled-Z quantum logic gate. As used in this disclosure, a controlled-Z gate can include a controlled-Z quantum logic gate. During the idle period, the control system applies a different magnetic flux bias that raises the impedance state of the tunable coupling element to isolate the ports and stop residual coupling. For example, detuning the coupler by 500 MHz above both fluxonium operating points combined with impedance states exceeding 300Ω equivalent can suppress parasitic interactions to below 0.1% crosstalk probability per cycle.

The transmon coupler qubit 322 and associated control architecture can provide a highly adaptable architectural feature in hybrid fluxonium-transmon systems. Moreover, the transmon coupler qubit 322 and associated control architecture can allow a control system to switch seamlessly between an entanglement-ready low-impedance mode in active cycles and a high-impedance isolation mode during idle periods. This degree of control can increase the likeli-hood of preserving encoded logical states over many opera-tional rounds.

Some embodiments can fabricate a circuit shown in FIG. 3 by preparing a common substrate such as high-resistivity silicon or sapphire to serve as the physical base for first fluxonium qubit 302, second fluxonium qubit 346, and transmon coupler qubit 322. Using a common substrate for both qubit types increases alignment precision between the first port connected to the first fluxonium qubit via first fluxonium-coupler capacitive connection J1c 318 and the second port connected to the second fluxonium qubit via the second fluxonium-coupler capacitive connection J2c 342. The use of the common substrate for first fluxonium qubit 302, second fluxonium qubit 346, and transmon coupler qubit 322 can reduce parasitic impedance and stray coupling paths and simplifies scaling to large qubit arrays.

Fluxonium qubits such as first fluxonium qubit 302 and second fluxonium qubit 346 can include high inductance elements formed using nanowire patterned from high kinetic inductance materials such as superconducting granular alu-minum or superinductor chains consisting of many Joseph-son junctions in series. For example, the first fluxonium qubit inductor 314 can be fabricated as a spiral nanowire array with inductance in the microhenry range, while the second fluxonium qubit inductor 358 can be fabricated as a superinductor loop array. Both qubit types can have large-area capacitor pads such as first fluxonium qubit capacitor 310 and second fluxonium qubit capacitor 354 to set charg-ing energy EC and improve resilience to charge noise. For example, the first fluxonium qubit Josephson junction 306 and the second fluxonium qubit Josephson junction 350 can be fabricated using controlled oxidation between sequential aluminum depositions to form tunnel barriers with critical currents tuned to operate below 1.0 GHz.

The transmon coupler qubit 322 can contain multi-junction elements such as a first transmon coupler Josephson junction 326 and second transmon coupler Josephson junction 330, arranged in a split-junction configuration. This configuration enables resonance frequency tuning via magnetic flux increase, allowing the impedance state of the tunable coupling element formed from the first transmon coupler Josephson junction 326 and the second transmon coupler Josephson junction 330 to be switched between low/high for active gates/an idle period. The transmon coupler capacitor 334 can be defined to provide a charging energy suitable for coupling operations, while the resonator represented by the first transmon-fluxonium shared coupling element 338 can be patterned as a coplanar waveguide or $\lambda/4$ resonator to mediate gates between both qubit types.

One example approach can co-fabricate the plurality of fluxonium qubits and the plurality of transmon qubits on the common substrate using a multi-layer aluminum deposition process where controlled oxidation defines Josephson junctions for both qubit types in a single lithography mask set. In such a process, the first fluxonium qubit Josephson junction 306, the second fluxonium qubit Josephson junction 350, the first transmon coupler Josephson junction 326, and the second transmon coupler Josephson junction 330 can be concurrently patterned, oxidized, and completed using a shadow evaporation method to maintain uniformity in superconducting material interfaces. As another example, some embodiments can fabricate the first fluxonium qubit inductor 314 and the second fluxonium qubit inductor 358 from high kinetic inductance films deposited after junction formation so that coupling properties of the first transmon coupler Josephson junction 326 and the second transmon coupler Josephson junction 330 remain unchanged.

A variation can fabricate asymmetric multi-junction elements in the transmon coupler qubit 322 to expand the tunability range over several hundred MHz, improving gate flexibility. Another variation can integrate planar resonator structures directly adjacent to the first transmon-fluxonium shared coupling element 338 and couple them selectively to the first fluxonium-coupler capacitive connection J1c 318 and the second fluxonium-coupler capacitive connection J2c 342 during an active cycle while detuning them during the idle period to isolate both qubit types.

In some embodiments, one or more fabrication methods described in this disclosure can produce an integrated hybrid architecture on a common substrate where both qubit types (i.e., fluxonium qubits and transmon qubits) share precisely aligned coupling ports, resonator paths, and junction fabrication parameters. Such integration can increase the likelihood of achieving high-fidelity interaction states during active gates and strong isolation during idle periods, while maintaining consistent material and electrical properties across the entire chip.

FIG. 4 shows flowchart of a process 400 for operating a hybrid fluxonium-transmon-fluxonium quantum system for quantum error correction, in accordance with one or more embodiments. Some embodiments can prepare fluxonium data qubits and transmon ancilla qubits by calibrating resonators or coupling control circuit to operational conditions, as indicated by block 404. The preparation of fluxonium data qubits and transmon ancilla qubits can involve arranging fluxonium data qubits in either a linear lattice structure or a two dimensional lattice structure, with transmon ancilla qubits positioned to act as ancilla elements for syndrome extraction in quantum error correction schemes. Resonator mediated coupling schemes can be implemented to enable selective interactions between fluxonium data qubits and transmon ancilla qubits within the hybrid fluxonium transmon fluxonium quantum system. Calibration procedures for the hybrid fluxonium transmon fluxonium quantum system can incorporate tuning flux control lines to precise flux values for each fluxonium data qubit and for each transmon ancilla qubit. The Calibration procedures can also include setting microwave sources to match the transition frequencies of one or more fluxonium data qubits or one or more transmon ancilla qubits. The calibration of microwave sources to match fluxonium qubit transition frequencies or transmon qubit transition frequencies increases the likelihood of achieving optimal conditions for subsequent quantum operations within the hybrid fluxonium transmon fluxonium quantum system.

Some embodiments can reset some or all of a set of resonator-mediated coupling paths to a baseline state to minimize residual excitations. High-inductance elements in the fluxonium qubits can be tuned using integrated flux control lines, while transmon qubits can be set to a target initialization state, such as a $|+\rangle$ state, for error correction routines. The resonators can be tested through low-level excitation signals to verify frequency response and quality factor alignment for both control and readout resonators. Microwave generators can then be calibrated to the individual qubit transition frequencies using pulse sequencing hardware, ensuring synchronized signal delivery. Resonator mediation can then be finely adjusted to match coupling requirements between data and ancilla qubits in preparation for upcoming gate sequences.

For example, a computer system can reset a superconducting quantum processor containing six fluxonium qubits in a linear array, with five transmon ancilla qubits positioned in an interleaving fashion between the fluxonium qubits. The computer system can issue flux tuning signals to each fluxonium qubit, verifying that each achieves the required inductive response. The computer system can then calibrate microwave generators to the specific transition frequencies of each qubit, checking resonance with weak probe signals. Finally, the computer system can configure the resonator-mediated coupling circuits to match the operational regime needed for controlled-NOT gate operations between target fluxonium data qubits and adjacent transmon ancilla qubits.

Some embodiments can initialize system qubits and adjust coupling strength between one or more pairs of fluxonium qubits using one or more tunable coupling elements of associated transmon ancilla qubits between the one or more pairs of fluxonium qubits, as indicated by block 408. Some embodiments can initialize system qubits and adjust coupling strength between a first fluxonium qubit and a second fluxonium qubit using a tunable coupling element of a first transmon ancilla qubit. Initialization can involve preparing the fluxonium and transmon circuits into defined quantum states suitable for interaction, followed by activating a tunable coupler connecting the fluxonium qubits that is associated with the transmon ancilla qubit. Adjustment of the coupling strength can be achieved through control of the coupler impedance or flux bias within the coupler loop, allowing mediation of entangling gates such as controlled-NOT or controlled-Z while increasing the likelihood of reduced idle-state crosstalk. This configuration can support precise entangling operations without degrading individual qubit coherence.

Some embodiments can perform initialization by first calibrating the operating parameters of fluxonium data qubits, including energy levels of each fluxonium data qubit defined by Josephson, capacitive, and inductive components. Transmon ancilla qubits can be positioned adjacent to fluxonium data qubits and linked via a resonator-mediated or direct capacitive coupling architecture. A coupling element located centrally between two fluxonium qubits can possess tunable properties (e.g., adjustable Josephson energies or variable cross-capacitances). Controlled flux bias can be applied to the tunable coupling element to achieve desired interaction strengths, enabling on-demand modulation of coherent quantum gates. The process can involve sequencing control pulses through microwave sources aligned to qubit resonance frequencies, synchronizing timing with the coupler adjustments for gated operations.

As an example, a computer system can prepare two fluxonium data qubits arranged within a linear array and position a transmon ancilla qubit between them. The computer system can activate a tunable coupler containing a pair of Josephson junctions configured in a loop between the two fluxonium data qubits. The computer system can vary the magnetic flux applied to the coupler loop to change the interaction strength between the qubits, thereby configuring the coupling for a controlled-Z gate operation. After the gate is completed, the computer system can reduce the coupling to an idle-safe level to increase the likelihood of maintaining qubit coherence for subsequent operations.

Some embodiments can adjust the coupling strength between fluxonium data qubits by tuning a resonator element electrically linked through an ancilla transmon's tunable coupling element, allowing selective entanglement via intermediate resonator control. Some embodiments can tune a resonator element disposed between the first fluxonium qubit and the second fluxonium qubit, the resonator element having a first port connected to the first fluxonium qubit and a second port connected to the second fluxonium qubit through the tunable coupling element of the first transmon qubit. Such operations can enable low-crosstalk entangling gates by introducing a frequency-selective intermediary that precisely modulates interaction strength while leaving individual qubit biasing untouched.

For example, a resonator can be a $\lambda/2$ coplanar waveguide structure fabricated from niobium with a center conductor width of 12 micrometers ($\mu$m) and gap spacing of 6 $\mu$m on a sapphire substrate to achieve a room-temperature impedance of 50$\Omega$ and cryogenic loaded Q greater than 3,000. A first coupling capacitor (Cc1) of 8 femtofarads (fF) connects the resonator's input port to the first fluxonium qubit's junction loop, while the output port couples to a transmon ancilla acting as a tunable coupler via a second coupling capacitor (Cc2) of 10 fF. The tunable coupler can include a DC SQUID with aluminum junctions, each having a critical current of 200 nanoamperes nA and an intrinsic capacitance of 2 fF, enabling flux-dependent inductance variation between 0.5 nanohenries (nH) and 6 nH.

Tuning the coupling strength between the data qubits can be accomplished by adjusting a coupler impedance. For example, a flux bias line fabricated with a superconducting microstrip can deliver calibrated current pulses of +30 microamperes ($\mu$A) generated by a 14-bit DAC operating at 1 GS/s. This operation varies the interaction strength between the qubits while maintaining a fixed resonator frequency in the coupling path. During entangling operations, the control system sends synchronized flux pulses to set the coupler's impedance to establish strong coupling for gate execution. The high-resolution pulse sequencer aligns this impedance adjustment with the start of an entangling gate, such as a controlled-Z gate, which might have a total interaction time of 200 ns with fidelity exceeding 99 percent. Some embodiments can also use pure microwave pulses to achieve the same.

Some embodiments can control the coupling strength during operation by supplying a flux-bias signal to a tunable coupler (e.g., a transmon qubit being used to couple two fluxonium qubits). Such operations can vary the effective inductance of a tunable coupling element within the tunable coupler and modulate interaction between the fluxonium data qubits. Some embodiments can adjust the coupling strength by supplying a flux bias signal via the coupling control circuit to vary an effective inductance of the tunable coupling element. Such operations can enable rapid transitions between high-coupling and low-coupling states, allow precise control of entangling gate durations, and reduce idle-state crosstalk without altering the operating bias points of individual qubits.

In one example, the tunable coupling element can be or can include an inductive Josephson junction network integrated into the ancilla transmon qubit's coupling path. This network can incorporate two or more small-area Josephson junctions whose total Josephson energy and effective inductance change when magnetic flux is applied through a local control line. The Josephson junctions can have a critical current of about 250 nA and a junction capacitance near 2 femtofarads (fF), with superconducting wiring in a closed loop geometry to permit magnetic flux threading while retaining the transmon's core functionality for control and readout. The coupling control circuit interfaces with the flux-bias line via superconducting microstrip traces matched to a 50 ohms (($2$) impedance and terminated at the cryogenic stage to suppress electrical reflections.

For example, a fourteen-bit digital-to-analog converter (DAC) operating at a one gigasample-per-second (GS/s) rate can generate bias current waveforms, delivered to the inductive element's flux line. For idle states, the DAC can output a steady bias that sets the inductive network to approximately five nanohenries (nH), detuning the coupling by shifting its response four hundred megahertz (MHz) away from the qubits' operating frequencies. During entangling operations, such as a controlled-Z gate, the DAC can produce a synchronized thirty-five microampere ($\mu$A) bias pulse lasting thirty nanoseconds (ns), altering the inductance to about 0.7 nH and moving the coupling band close to resonance with the fluxonium qubits. A field-programmable gate array (FPGA)-based pulse sequencer can coordinate bias changes with qubit control pulses to sub-nanosecond precision, ensuring coupling is only active during defined gate windows.

Some embodiments can reduce crosstalk between fluxonium data qubits by precharging the tunable coupling element of a transmon qubit to a high-impedance state before an idle period, thereby minimizing unwanted residual interactions. Some embodiments can, prior to the idle period, precharge the tunable coupling element to an increased impedance state to reduce crosstalk between the first fluxonium qubit and the second fluxonium qubit. Such operations can help preserve qubit coherence during idle periods, increase the likelihood of reduced dephasing from unintended interactions, and improve quantum error correction performance.

In one example, the tunable coupling element within the ancilla transmon's coupling path can include an inductive network of flux-tunable Josephson junctions. Before an idle period, the coupling control circuit can output a controlled bias waveform via a superconducting flux-bias line to drive the inductive network into a high-impedance regime, such as greater than 500 ohms (2), by increasing the effective inductance to approximately 7 nanohenries (nH). This bias waveform can be generated by a fourteen-bit DAC operating at one gigasample per second (GS/s) and synchronized by a FPGA-based sequencer with sub-nanosecond accuracy. The DAC output can be shaped, for example, as a Gaussian-rise voltage pulse to prevent abrupt switching transients that might couple into nearby qubits. The impedance shift can be completed within 15 nanoseconds (ns) and maintained until the next active gate operation, thereby reducing residual exchange between the fluxonium data qubits by more than 95 percent compared to the low-impedance entangling state.

Some embodiments can determine whether an idle period is detected between the one or more pairs of fluxonium qubits, as indicated by block 412. Some embodiments can determine whether an idle period is detected between the pair of fluxonium data qubits by monitoring the timing signals associated with scheduled gate operations and logical interactions. These embodiments can analyze operational sequences from a control schedule to locate temporal gaps where no active logical gates are assigned between the fluxonium qubits. The detection of such gaps can trigger adjustments to coupling elements in order to reduce residual interactions, thereby increasing the likelihood of stable qubit states during non-interaction phases.

Some embodiments can direct control circuitry to receive timing data from the pulse sequence scheduler and compare scheduled gate execution timestamps for the relevant fluxonium qubits. When the analysis identifies intervals that exceed a predefined threshold without scheduled active gates or operations, a signal can be generated to indicate an idle state. This signal can be routed to a coupling control unit, which can respond by changing the impedance setting or isolating the coupling circuit to mitigate residual crosstalk. Feedback from measurement or monitoring subsystems can confirm effective decoupling and stability, which increases the likelihood of optimal idle state performance.

For example, a computer system can receive a compiled quantum gate schedule showing multiple sequential operations among fluxonium data qubits and transmon ancilla qubits. The computer system can detect a three-microsecond period with no assigned interactions between a particular pair of fluxonium qubits. The computer system can then issue a control command to adjust the variable impedance in the relevant tunable coupling element to a high-impedance state until the next scheduled gate operation begins, allowing the qubits to remain isolated during the idle period.

If an idle period is detected, operations of the process can proceed to block 420. Otherwise, operations can proceed to block 424, as indicated by block 424.

Some embodiments can increase the impedance state of the one or more tunable coupling elements, as indicated by block 420. Some embodiments can increase the impedance state of a tunable coupling element in response to a detected idle period before the next gate operation. This can be implemented within a hybrid fluxonium-transmon system to reduce idle-state crosstalk and preserve coherence during quantum error correction cycles. The coupling strength between qubits can be adjusted by controlling the central coupler element, possibly through flux biasing in a coupler loop. Increasing the impedance during idle periods can reduce unwanted interactions between qubits, increasing the likelihood of maintaining fidelity until the next scheduled gate operation.

Some embodiments can employ a tunable coupler qubit positioned between superconducting qubits, which can be either fluxonium or transmon types. The tunable coupler qubit can include one or more tunable coupling elements such as Josephson junction elements arranged in a loop configuration along with cross-capacitances connected to each qubit. By modulating a tunable coupler qubit's bias, the system can adjust the coupling energy from a low-impedance state suitable for gate execution to a higher impedance state during idle times. This increase in impedance can diminish the coupling amplitude, thereby decreasing parasitic excitations or leakage. The control system can manage microwave waveform patterns and timing sequences to switch the coupler impedance state in synchrony with the qubit operation schedule.

For example, a computer system can detect that two fluxonium data qubits coupled through an intermediate tunable coupler qubit will not require gate interaction for several cycles. The computer system can then issue a control pulse to the coupler bias line, raising the coupler impedance from 50Ω to 500Ω. This change can significantly reduce the transverse coupling between the qubits, increasing the likelihood of preserving their quantum states during the idle period. Once the next gate operation is scheduled, the computer system can restore the impedance to its low level to enable fast and accurate qubit interactions.

Some embodiments can initiate a quantum error correction cycle by executing scheduled quantum gate interactions between transmon ancilla qubits and fluxonium data qubits according to a defined gate interaction schedule, as indicated by block 424. A control system can configure high-resolution pulse sequencing hardware to coordinate the scheduled quantum gate interactions. The transmon ancilla qubits start in a predetermined state that aligns with the encoded logical information stored in the fluxonium data qubits. The control system applies controlled-NOT gates or other conditional quantum operations across the hybrid qubit architecture through mediated coupling, which reduces crosstalk and maintains quantum gate fidelity. These scheduled quantum gate interactions increase the likelihood of accurate syndrome extraction during the subsequent quantum measurement phases.

Some embodiments can obtain quantum error correction data by initiating the scheduled quantum gate interactions between the transmon ancilla qubits and the fluxonium data qubits arranged in a linear configuration. Some embodiments can adjust the coupling impedance through flux tuning operations to establish the correct interaction strength. Some embodiments can then apply controlled-NOT or controlled-Z gates between each fluxonium data qubit and its associated transmon ancilla qubit according to the quantum gate interaction schedule. The resulting entangled quantum states between data qubits and ancilla qubits encode the error information into the ancilla qubits, enabling detection of the error condition in the upcoming quantum measurement stage.

For example, a computer system can configure a hybrid architecture where three fluxonium data qubits each connect to transmon ancilla qubits within a planar layout. The computer system can schedule a sequence of microwave control pulses routed through dedicated quantum control lines to perform controlled-NOT or controlled-Z gate operations between targeted fluxonium-transmon pairs. Before the execution of the scheduled quantum gate interactions, the computer system applies flux bias adjustments to achieve the desired impedance for selective coupling. After completing the scheduled quantum gate interactions, the state of each transmon ancilla qubit correlates with the encoded logical quantum state of the fluxonium data qubits, preparing the system for quantum syndrome measurement.

Some embodiments can operate a hybrid fluxonium-transmon quantum error correction system according to a rotated surface code protocol, utilizing transmon qubits positioned at vertex locations of a two-dimensional lattice to both couple fluxonium data qubits and extract error syndromes. Some embodiments can operate the plurality of fluxonium qubits and the plurality of transmon qubits according to a rotated surface code error correction cycle, wherein the plurality of transmon qubits are positioned at vertex locations of a two-dimensional lattice. Such operations can increase error suppression against both bit-flip and phase-flip noise, achieve logical qubit encoding with fewer physical qubits compared to unrotated surface code layouts, and enable more compact routing of control and readout lines in superconducting devices.

For example, a quantum processor chip can integrate fluxonium data qubits on the edges of a square-type two-dimensional lattice, with transmon ancilla qubits at the vertices connecting to four adjacent fluxonium qubits via resonator-mediated coupling paths. Each transmon ancilla qubit acts as both a coupler for multi-qubit gates and as a readout channel for syndrome determination. During an error correction cycle, control electronics sequence microwave drive pulses and flux-bias adjustments so that each transmon ancilla qubit interacts, in turn, with its neighboring fluxonium data qubits to perform stabilizer measurements. The control sequence can include initialization of the ancilla qubit into the plus state via a Hadamard rotation, followed by sets of controlled-NOT or controlled-Z gate operations timed to synchronize coupling activation with gating intervals, and concluding with measurement in the X-basis. Syndrome bits from all ancilla qubits are processed by a real-time error-correction controller, which calculates the appropriate Pauli gates to apply to fluxonium data qubits to restore the intended logical state.

Some embodiments can prevent crosstalk induced by one or more quantum gate operations by deactivating the coupling function of one or more tunable coupling assemblies. In some embodiments, deactivating the coupling function of a tunable coupling assembly comprises setting, such as by setting a tunable coupler qubit within the one or more tunable coupling assemblies to a high-impedance state between non-target fluxonium qubit pairs This operation electrically isolates the fluxonium qubits at the endpoints of the assembly and suppresses residual interactions during the idle period. By performing this deactivation for each assembly associated with non-target fluxonium qubit pairs, such embodiments can execute a quantum gate operation on a target fluxonium qubit pair in a chain arrangement after the deactivating of the tunable coupling elements. Such operations can reduce the likelihood of unintended entanglement between non-target qubits, improve fidelity of the target gate, and sustain overall coherence levels in multi qubit architectures.

For example, in a superconducting quantum processor with a chain of fluxonium data qubits separated by transmon coupling qubits acting as tunable couplers, each tunable coupler can connect two adjacent fluxonium qubits through a flux-controlled inductive path. A command from the system controller can send flux-bias signals through on-chip control lines to set the inductance of couplers connected to non target qubit pairs to a high value, such as five nanohenries, detuning them several hundred megahertz away from resonance with the qubits. The flux-bias signals can be generated by a fourteen-bit DAC running at a one gigasample-per-second (GS/s) rate and synchronized through a FPGA with control pulses for the target gate operation. Once the non target couplers are deactivated, the FPGA can trigger microwave gate pulses delivered to the target pair's control lines for execution of a controlled-Z gate at the appropriate frequency, for example 650 megahertz for the fluxonium qubit and 5.6 GHz for the transmon coupler. Gate duration can be set to 200 nanoseconds to maximize fidelity while minimizing idle time for other qubits.

Some embodiments can obtain syndrome information by measuring the state of the transmon ancilla qubits via a one or more dedicated readout resonators in a predetermined basis and reset the measured ancilla qubits, as indicated by block 428. Some embodiments can obtain syndrome information by measuring the quantum state of transmon ancilla qubits that have been entangled with fluxonium data qubits during scheduled quantum gate interactions. The process can begin with the control system transmitting a readout signal to each respective dedicated readout resonator coupled to a transmon ancilla qubit. This readout signal can excite the resonator in a manner that reveals the qubit's state through shifts in amplitude, phase, or frequency response. Detection equipment in the readout chain can measure the resonator's response, and processing algorithms can interpret these readings in a predetermined basis (e.g., the computational basis or the superposition basis) to extract syndrome information. Syndrome information can be a binary or multi-valued set of results indicating whether correlated errors such as bit-flip or phase-flip errors have occurred within the fluxonium data qubits during the quantum error correction cycle. The obtained syndrome information can act as a compact representation of the collective error state without directly revealing the encoded logical qubit value.

Some embodiments can proceed by using the syndrome information not only to determine the presence or absence of an error but also to locate which fluxonium data qubits are affected. For a repetition code configuration, syndrome information can appear as a sequence of bits, each corresponding to the outcome of measuring an ancilla qubit. Each respective ancilla qubit measurement outcome can signal the parity between its respective connected data qubits. A "0" might indicate no parity change between the linked qubits, implying no detected error, while a "1" could indicate a parity mismatch consistent with a single-qubit error. Once the control system processes these bits, targeted control pulses can be sent to the affected fluxonium data qubits to correct the identified errors. Immediately after measurement and analysis, the system can actively reset each respective transmon ancilla qubit to a defined state, restoring readiness for another round of scheduled gate interactions.

In some embodiments, a hybrid system can provide an implementation of an n-qubit repetition code that uses fluxonium data qubits to redundantly encode quantum information, thereby protecting it against common quantum errors. In this scheme, the logical qubit represents an arrangement of identical states distributed across n individual fluxonium qubits, where n is an integer greater than one. For bit-flip error protection, the logical zero state can be defined as $|0\rangle L = |00 \ldots 0\rangle$, meaning that all n physical data qubits are initialized into the computational basis state $|0\rangle$. The logical one state is defined as $|1\rangle L = |11 \ldots 1\rangle$, where every data qubit stores the $|1\rangle$ state. This choice makes it possible to detect and correct single-qubit bit-flips by checking for discrepancies between the majority of the qubits' values.

To guard against phase-flip errors, some embodiments can use the same repetition principle but in the X-basis rather than the computational Z-basis. In this basis, the $|+\rangle$ can be defined as $|+\rangle=(|0\rangle+|1\rangle)/\text{sqrt}(2)$, and the $|-\rangle$ state can be defined as $|-\rangle=(|0\rangle-|1\rangle)/\text{sqrt}(2)$. A phase-flip (Pauli Z) error swaps $|+\rangle$ with $|-\rangle$, making it analogous to a bit-flip in this rotated viewpoint. Accordingly, the logical plus state is defined as $|+\rangle L=|++\ldots+\rangle$ and the logical minus state as $|-\rangle L=|---\ldots-\rangle$, ensuring that all qubits in the block carry the same X-basis value. This encoding allows phase errors on individual qubits to be detected and corrected by comparing the majority of states in the block, just as with the bit-flip case.

Once the encoding is established, some embodiments can perform syndrome extraction to determine whether an error has occurred, and, if so, where. Some embodiments can use ancilla qubits (e.g., the ancilla transmon qubits) that interact with the encoded data qubits but do not themselves store the logical information. Each ancilla qubit can be initialized in the $|+\rangle$ state in preparation for error detection. Some embodiments can then apply controlled-NOT or controlled-Z gates between selected data qubits and the ancilla qubit, (e.g., between adjacent pairs of fluxonium qubits), so that the ancilla state accumulates parity information about the data qubits without collapsing the logical state. After these gate operations, the ancilla qubit is measured in the X-basis. As described elsewhere in this disclosure, this measurement can reveal the error syndrome, which is a pattern indicating whether a bit-flip or phase-flip occurred and pinpointing the qubit likely affected.

For example, a computer system can execute a repetition code quantum error correction cycle using three fluxonium data qubits and two respective transmon ancilla qubits. After entangling via controlled-NOT gates, the computer system can send a readout signal to each dedicated readout resonator attached to the ancilla qubits. Response detection might yield syndrome information such as "0 1", meaning the first ancilla qubit detected no parity change between its connected fluxonium data qubits, while the second ancilla qubit detected a mismatch. This mismatch ("1") would signify an error in one of the pairs of fluxonium qubits monitored by the second ancilla qubit. The computer system can then apply a corrective X-gate pulse to the identified erroneous fluxonium qubit, followed by transmitting reset pulses to the respective ancilla qubits to restore them to a prepared superposition state for reuse.

As another example, a quantum processor arranged in a two-dimensional grid can perform parallel syndrome extraction with multiple respective transmon ancilla qubits. Each readout resonator can receive a readout signal and return a measurement result, forming a syndrome vector such as "1 0 0 1". The first and fourth entries of "1" could indicate detected parity mismatches, pointing to possible bit-flip errors in the data qubits adjacent to those respective ancilla qubits. Processing logic can then initiate simultaneous correction pulses to the erroneous fluxonium qubits, followed directly by resets of the respective ancilla qubits to a ground state to maximize operational throughput in the next cycle.

Some embodiments can dynamically adapt the sequence, timing, or basis of syndrome measurements during a quantum error correction cycle based on previously obtained syndrome information, enabling the system to tailor error detection to current noise characteristics. Some embodiments can measure the first transmon qubit by adjusting a measurement timing or measurement basis based on additional syndrome information that is previously obtained from the plurality of transmon qubits. Such operations can increase the likelihood of intercepting errors correlated with recent noise events, improve statistical discrimination between error types, and reduce unnecessary measurements in irrelevant bases.

In a superconducting quantum error correction system, a control unit can integrate high-speed syndrome processing hardware such as an FPGA with adaptive control software. During each quantum error correction cycle, the FPGA receives continuous data from the readout chain, which includes a low-noise cryogenic amplifier, downconversion mixers, and a digitizer sampling at rates above 1 Gsps. The digitized signals correspond to measured responses from dedicated readout resonators coupled to ancilla transmon qubits. The FPGA classifies each syndrome measurement as belonging to a defined set of error classes such as bit-flip, phase-flip, or combined errors. The adaptive control software maintains a rolling statistical map of error occurrences over recent cycles and calculates likelihood weighting for each error type.

When the error likelihood for a given type surpasses a threshold (for example, 70 percent dominance of phase-flip errors), the software can send new parameter sets to the high-resolution pulse sequencer through a low-latency control bus. These parameter sets consist of (i) gate sequences including qubit rotations such as a Hadamard gate to change the measurement basis from Z to X, (11) modified microwave drive frequencies tuned to the altered basis, and (iii) adjusted pulse delays ranging from sub-nanosecond to hundreds of nanoseconds based on recent qubit relaxation and dephasing statistics. The pulse sequencer then generates modified measurement pulses for the targeted ancilla qubits in the subsequent cycle.

For example, in a hybrid fluxonium-transmon repetition code, if the adaptive control detects an increased phase-flip error rate caused by temporal magnetic flux fluctuations, the sequencer inserts calibrated Hadamard gates prior to measurement on affected transmon qubits. The readout microwave pulses, originally 25-nanosecond length in the Z basis at 6.8 GHZ, are replaced with 30-nanosecond length X-basis pulses at precisely tuned frequencies to match the resonance shift introduced by the basis rotation. In addition, the timing of these pulses is delayed by 20 nanoseconds relative to the previous cycle to optimize integration time for the evolving signal-to-noise profile. The modified control instructions propagate in under 200 nanoseconds from syndrome classification to pulse emission, ensuring real-time adaptation.

As part of performing a quantum error correction cycle, or independently from performing the quantum error correction cycle, some embodiments can initialize a transmon ancilla-coupler qubit into the plus state, applying a controlled-NOT gate between it and a fluxonium data qubit, and measuring the ancilla qubit in the X-basis to extract syndrome data for subsequent correction. Some embodiments can initialize the first transmon qubit in the X-basis, perform an entangling controlled-NOT gate operation by transmitting control pulses to the first fluxonium qubit and the first transmon qubit through the coupling control circuit, and measure the first transmon qubit in the X-basis to obtain the syndrome information. Such operations can increase the likelihood of accurate extraction of phase and bit-flip error syndromes in repetition or surface code error correction, reduce readout bias errors through basis alignment, and preserve coherence of data qubits during indirect error measurement.

For example, in a hybrid superconducting quantum processor, the initialization sequence can employ a calibrated Hadamard pulse generated by a microwave source at the transition frequency of the transmon qubit, placing the transmon in the plus state. The coupling control circuit can then activate a tunable coupling path between the fluxonium data qubit and the transmon ancilla qubit. A controlled-NOT gate can be implemented by applying a fluxonium control pulse at its operating frequency (for example, 650 megahertz) to act as the control qubit and a shaped microwave pulse at the transmon frequency (for example, 5.6 GHz) to act as the target qubit, with simultaneous coupling activation timed to sub-nanosecond precision by a FPGA sequencer. Gate duration can be set to 200 nanoseconds for optimal fidelity. After the gate operation, the transmon qubit can be measured in the X-basis by applying a second Hadamard rotation followed by a resonator readout pulse tuned to the transmon readout resonator (for example, 6.8 GHz), with signal processing equipment demodulating the response to extract the syndrome bit value. This value can then be sent to the real-time error processor to determine if corrective operations, such as Pauli-X or Pauli-Z gates, must be applied to the fluxonium data qubit.

Some embodiments can determine whether an error is detected based on the syndrome information, as indicated by block 436. Some embodiments can determine whether an error is detected based on the processed syndrome information obtained by converting the measured state outcomes of transmon ancilla qubits into discrete syndrome bit values. In a repetition code implementation, each transmon ancilla qubit can function as an error detector for its adjacent fluxonium data qubits. The measurement in a predetermined basis, such as the X-basis for phase errors or Z-basis for bit errors, can produce a binary result represented as +1 or −1 in parity checks or as logical 0 or 1 in computational form. These results can be assembled into a syndrome vector, where each position in the vector corresponds to a specific ancilla qubit and thus indirectly to a specific subset of fluxonium data qubits. The control system can compare the syndrome vector to an ideal zero-error syndrome pattern and use deviations in specific positions as indicators of localized qubit errors.

Some embodiments can implement a decoding protocol in which the syndrome vector is processed through parity check logic, matrix multiplication with a stabilizer matrix, or more advanced decoding algorithms such as minimum weight perfect matching. When parity mismatches are detected in the syndrome vector, the location of the mismatch can be mapped back to one or more fluxonium data qubits. This mapping can be deduced from the known connectivity and placement of ancilla qubits relative to data qubits. For example, in a three-fluxonium data qubit repetition chain with two transmon ancilla qubits positioned between them, a detected mismatch in the syndrome of the first ancilla can indicate an error between the first and second fluxonium data qubit, while a mismatch in the syndrome of the second ancilla can indicate an error between the second and third fluxonium data qubit.

Some embodiments can further enhance detection accuracy by analyzing sequences of syndrome vectors across multiple cycles. A recurring mismatch in the same vector position can increase the likelihood of identifying a stable, non-transient error such as a calibration drift or a systematic control pulse misalignment. This temporal analysis can allow the control system to distinguish between single-cycle random errors and repeat-pattern errors that can require more persistent corrective action or hardware adjustment.

As an example, a computer system can operate a linear chain of three fluxonium data qubits with two transmon ancilla qubits. After scheduled controlled-NOT gate operations, the computer system can measure the ancilla qubits in the X-basis, deriving a syndrome vector. Suppose the ideal no-error vector is [0,0], meaning both ancilla measurements output logical 0 in the computational form. If the measured vector is [1,0], the computer system can infer that the parity between the first and second fluxonium qubits is incorrect, directly indicating that either the first or second fluxonium data qubit has experienced a phase-flip error. The error localization is possible because the mapping between ancilla qubits and the data qubits they connect is predetermined in the hardware configuration.

As another example, the computer system can run a two-dimensional grid with four fluxonium data qubits and four transmon ancilla qubits placed at the vertices. Syndromes can be recorded as a vector such as [0,1,1,0], where each position represents an ancilla in the grid checking a different stabilizer relation. A deviation like the second and third syndrome positions producing 1 instead of 0 can indicate that both corresponding stabilizer checks have failed. Using the known mapping, the computer system can determine that these failures overlap in referencing a particular data qubit, increasing the likelihood that this qubit is the source of both detected errors, and thus leading to a confident identification of the faulty fluxonium data qubit.

If an error is detected, operations of the process can proceed to block 444. Otherwise, operations can loop back to block 404.

Some embodiments can apply correction operations using specified control pulses to a subset of the fluxonium data qubits identified as erroneous according to the syndrome information, as indicated by block 444. Some embodiments can apply correction operations using specified control pulses to a subset of fluxonium data qubits identified as erroneous according to the processed syndrome information by targeting the specific physical qubits implicated in the error map derived from syndrome decoding. The control system can select the appropriate pulse sequence based on the type of error, such as an X rotation for bit-flip correction or a Z rotation for phase-flip correction, and can generate precisely timed microwave signals at the qubit's transition frequency to implement the correction. The system can calibrate these pulses to achieve the required rotation angle with high fidelity while compensating for cross-talk or frequency drift.

Some embodiments can perform error correction by applying a corrective Pauli X operation to restore the correct logical state $|0\rangle$ L or $|1\rangle$ L if the syndrome shows that a data qubit has undergone a bit-flip. Alternatively, some embodiments can apply a Pauli Z operation to restore a logical state to $|+\rangle$ L or $|-\rangle$ L if the syndrome indicates a phase-flip. By continuously repeating this encode-detect-correct cycle, some embodiments can maintain the integrity of a logical qubit's state over time, despite the presence of physical noise sources that affect individual fluxonium qubits.

Operationally, some embodiments can configure the pulse sequencing hardware to synchronize correction pulses with the conclusion of the syndrome processing stage, minimizing idle time to reduce further decoherence. This implementation can involve routing control signals through dedicated flux control lines or microwave drive lines integrated into the hybrid fluxonium-transmon architecture. By sequencing corrections in real time, the control system can maintain the logical state of the encoded qubit and increase the likelihood of preserving coherence across the entire repetition code structure.

Some embodiments can integrate adaptive control logic that modifies correction parameters dynamically based on historical correction efficacy and recurring error patterns. This approach can refine pulse amplitudes, phase offsets, or duration to mitigate systematic control errors and to align corrections more closely with the physical characteristics of each fluxonium data qubit. Over time, such adaptive refinements can contribute to maintaining low logical error rates in both linear-chain and more complex two-dimensional grid arrangements.

For example, a computer system can operate three fluxonium data qubits in a linear repetition code with two transmon ancilla qubits. The computer system can measure the ancilla qubits, decode the syndrome vector, and determine that the second fluxonium qubit has experienced a bit-flip error. In response, the computer system can configure the microwave generator to emit an X$\pi$ pulse tuned to the second fluxonium's transition frequency. The high-resolution pulse sequencing hardware can deliver the correction pulse with nanosecond precision, restoring the qubit to its intended logical state without affecting its neighbors.

In another example, the computer system can operate a two-dimensional grid where syndrome processing identifies overlapping stabilizer violations pointing to a phase-flip error on a specific fluxonium data qubit. The computer system can generate a X$\pi$ pulse using the drive or flux control line associated with that qubit. This correction can be applied immediately after the syndrome extraction cycle, while adaptive control software logs the operation and updates its parameters periodically based on recurring phase error metrics for the targeted qubit.

Some embodiments can record applied correction results based on the applied correction operations, as indicated by block 448. Some embodiments can record applied correction results by logging the identity of fluxonium data qubits that received a correction operation, the type of correction pulse applied, and the timing of the operation relative to the quantum error correction cycle. The control system can store this information alongside the processed syndrome vector that led to the corrective action. This combined dataset can serve as an ongoing record of error occurrences and their associated corrections, allowing for retrospective analysis to detect trends or recurring fault patterns across multiple cycles. By preserving the mapping between syndrome results and correction actions, the system can increase the likelihood of identifying systematic errors that can require hardware recalibration or firmware adjustments.

Some embodiments can update stored syndrome history by appending new cycle data to a persistent memory structure, such as a database or structured log file, maintained by the control system. Each new entry can contain the raw measurement results from the transmon ancilla qubits, the interpreted syndrome vector, the determined error locations, and the applied correction operations. Over successive cycles, this historical record can support performance monitoring by enabling statistical analysis of error rates, detection accuracy, and correction efficacy. Adaptive control software can use this historical data to dynamically adjust calibration parameters, modify control pulse shapes, or update gate scheduling to counteract observed noise trends and maintain optimal logical qubit fidelity.

Some embodiments can integrate the syndrome history into visualization systems that allow operators to view error rate evolution, correlate error events to specific environmental conditions, and test adjustments to control strategies in simulation before deploying them to live qubit arrays. By coupling syndrome history with correction results, the system can create a feedback loop that continuously improves its error correction performance in response to real operational data.

For example, a computer system can run a sequence of 1,000 quantum error correction cycles on a linear chain of fluxonium data qubits. During the run, the computer system can detect a bit-flip error on the third fluxonium qubit in multiple cycles, applying an X-x correction pulse each time. Every correction action, including the qubit address, pulse parameters, and originating syndrome vector, can be logged to a structured historical record. After statistical analysis, the computer system can determine that the third qubit's error rate is significantly higher during specific time intervals, correlating with temperature fluctuations in the cryogenic housing.

In another example, the computer system can use syndrome history from a two-dimensional grid to identify that certain phase-flip errors consistently occur in the vicinity of a particular ancilla qubit. The stored data can reveal that these errors often follow high-frequency calibration routines applied to neighboring fluxonium qubits. The adaptive control software can adjust calibration sequences to minimize interference, updating both pulse schedules and coupling strength settings for subsequent error correction cycles.

Fluxonium-Fluxonium-Fluxonium Architecture

In some embodiments, a system can construct an all-fluxonium chain architecture that includes a series of fluxonium qubits in a linear arrangement, where some of the fluxonium qubits are used as data qubits and others of the fluxonium qubits are used as ancilla qubits. This architecture can differ from hybrid designs by using fluxonium exclusively for both data storage and ancilla roles, increasing uniformity in fabrication, calibration, and operational behavior. The architecture can use deliberate tuning of each qubit's transition frequency to differentiate functional roles and to support precise control in a densely coupled environment.

Some embodiments can rely on intentional frequency selection to mitigate drawbacks of an all-fluxonium qubit design. Due to their complex energy level structure, fluxonium qubits can be susceptible to leakage into non-computational states and unintended activation if transition frequencies overlap. By assigning distinct operating frequencies to data qubits and to coupler or ancilla qubits, each class of qubit occupies a separate position in the spectral domain. This spectral role separation enables control pulses to be targeted to one qubit type without inadvertently driving neighboring devices. In practice, coupler or ancilla qubits are tuned to intermediate frequencies between those of adjacent data qubits, creating a repeating pattern that supports selective gate activation and minimizes crosstalk.

Frequency selection is also important in preventing resonator and qubit mode crowding and preserving gate fidelity in longer chains. In architectures with uniform qubit types, shared coupling circuits can cause spectral overlaps that lead to uncontrolled interactions. Alternating qubit frequencies limit these effects by making it easier to isolate qubit-qubit interactions to intended pairs, thereby supporting cleaner execution of two-qubit gates such as controlled-Z or controlled-NOT. In error-correction tasks, different frequency allocations for data and ancilla qubits ensure that ancilla readout pulses do not disturb the quantum states of data qubits, supporting reliable syndrome extraction without introducing additional errors.

Operating entirely with fluxonium qubits offers advantages beyond frequency-based role separation. As described elsewhere, fluxonium devices can exhibit significantly longer energy relaxation times ($T_1$) and coherence times ($T_2$) compared to transmons, owing to their large inductive shunt and reduced sensitivity to charge noise. In an all-fluxonium system, these improved coherence characteristics apply uniformly across both data and ancilla qubits, potentially increasing the threshold for logical error rates and enabling the same code performance with fewer physical qubits. Uniform hardware modality also simplifies fabrication by eliminating the need to manufacture multiple qubit types, and streamlines control system design since the same pulse shaping and calibration strategies can be applied throughout.

The combination of long-coherence performance, predictable fabrication, reduced noise sensitivity, and frequency-engineered role separation makes the all-fluxonium chain well-suited for error-correction architectures. By strategically placing qubit frequencies in a repeating pattern and exploiting fluxonium's inherent advantages, the system maintains strong operational selectivity even at scale, avoids cross-activation, and protects against leakage into higher states, all while benefiting from the coherence and stability of a single, high-performance qubit modality.

Figure 5:
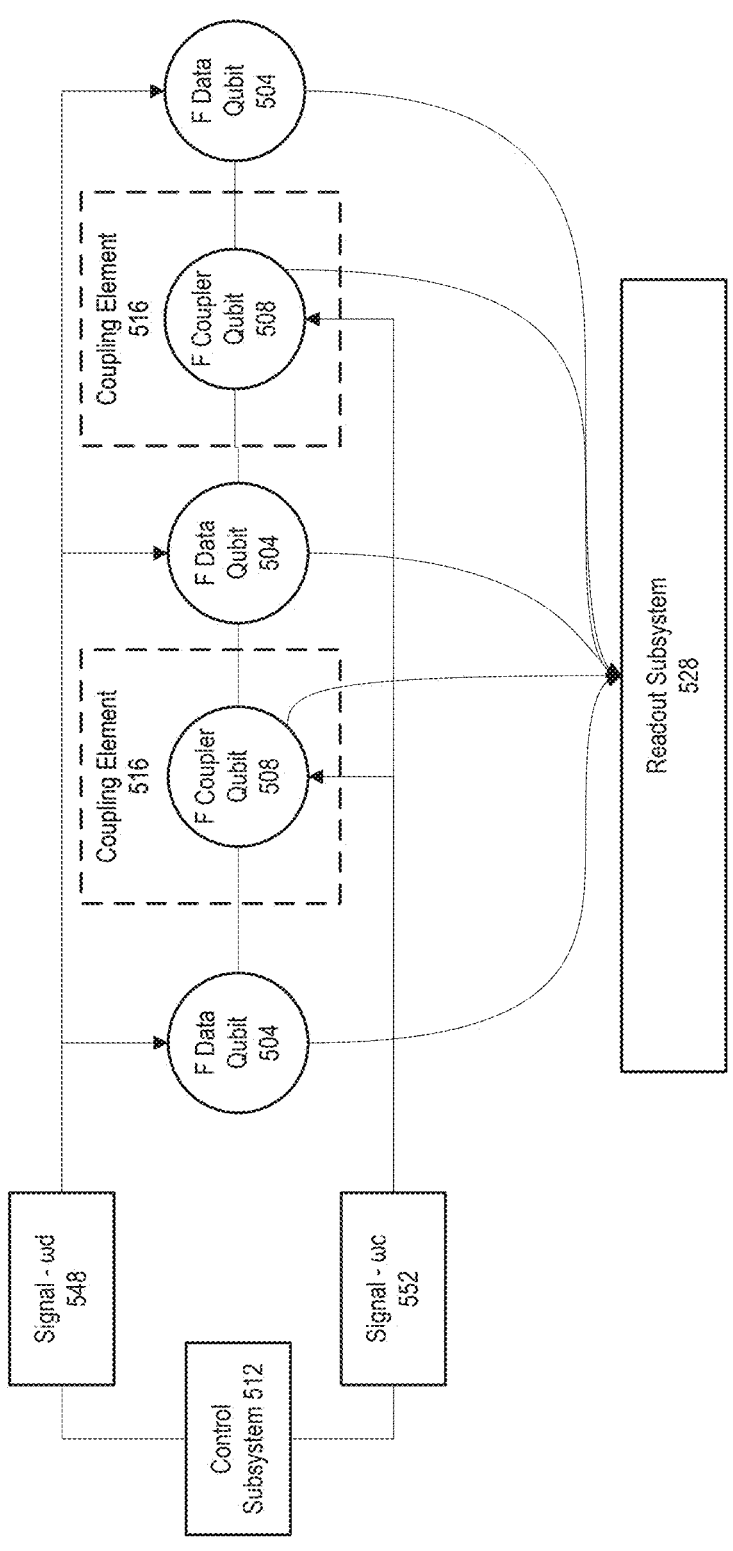
FIG. 5 illustrates a quantum processing system comprising a set of fluxonium data qubits physically arranged in a chain, in accordance with one or more embodiments.

FIG. 5 illustrates a quantum processing system comprising a set of fluxonium data qubits physically arranged in a chain, in accordance with one or more embodiments. The set of fluxonium data qubits 504 comprises a superconducting circuit having a Josephson junction, a large inductive loop, and integrated tuning hardware including a flux-bias line and one or more capacitive or inductive components that permit adjustment of the qubit's transition frequency. Each fluxonium data qubit of the set of fluxonium data qubits 504 is configured to store quantum information in a computational basis defined by a transition frequency od unique to that qubit. In the depicted example, the set of fluxonium data qubits 504 includes devices assigned frequencies in the range of approximately 480-510 MHz, optimized for coherence time and spectral separation from coupler qubits. Positioned between the set of fluxonium data qubits 504 is a set of fluxonium coupler qubits 508. Each qubit of the set of fluxonium coupler qubits 508 can be physically similar in construction to the data qubits and can include a Josephson junction, an inductive loop, and integrated tuning hardware such as a flux-bias line, but assigned a different transition frequency ωc. The ωc frequencies are distinct from and spectrally separated relative to the od frequencies of the adjacent fluxonium data qubits of the set of fluxonium data qubits 504, for example in the range of 590-600 MHz with a separation $|\omega c - \omega d|$ between 50 MHz and 250 MHz to permit selective activation without exciting the data qubits.

A control subsystem 512 can be configured as an external drive, sequencing, and signal-delivery system that interfaces electrically with the integrated tuning hardware of the set of fluxonium data qubits 504 and the set of fluxonium coupler qubits 508. The control subsystem 512 can include programmable current sources, microwave signal generators, waveform sequencing electronics, and calibration software that deliver signals to the flux-bias lines integrated into each qubit, thereby adjusting the effective inductance or other physical parameters to set and maintain the desired od and ωc frequencies. In some embodiments, the control subsystem 512 generates and delivers a first control signal 548 tuned to the transition frequency od of a selected fluxonium data qubit of the set of fluxonium data qubits 504, which addresses the qubit for single-qubit gate operations, initialization, or state preparation without engaging the set of fluxonium coupler qubits 508. The control subsystem 512 also generates and delivers a second control signal 552 tuned to the transition frequency ωc of a selected fluxonium coupler qubit of the set of fluxonium coupler qubits 508, used to activate coupling elements 516 that link a selected coupler qubit of the set of fluxonium coupler qubits 508 to two adjacent data qubits of the set of fluxonium data qubits 504.

The coupling elements 516 include the set of fluxonium coupler qubits 508 themselves and the physical connection structures (e.g., such as resonators, inductive links, or capacitive links) that form an electrical or electromagnetic pathway between each coupler qubit of the set of fluxonium coupler qubits 508 and adjoining data qubits of the set of fluxonium data qubits 504. These connection structures are integrated at the chip level and are part of the physical qubit interconnect architecture. When the second control signal 552 is applied at oc, the coupling elements 516 enable a controlled quantum interaction (e.g., a controlled-Z or controlled-NOT gate) between adjacent data qubits of the set of fluxonium data qubits 504 through coupler qubits of the set of fluxonium coupler qubits 508, while suppressing unintended excitation of other qubits in the chain.

A readout subsystem 528 is configured as an external measurement and signal-processing system that interfaces with readout resonators integrated into the set of fluxonium coupler qubits 508. By targeting ωc exclusively during the measurement process, the readout subsystem 528 avoids resonant excitation of the od frequencies associated with the set of fluxonium data qubits 504. In certain embodiments, the readout subsystem 528 employs dispersive readout in a resonator mode-matched to ωc or uses a Purcell-filtered measurement line to achieve non-demolition measurements and maintain data qubit coherence during error-correction operations. The alternating pattern of data qubit frequencies od and coupler qubit frequencies ωc, combined with the frequency-specific use of the first control signal 548 for data qubit operations and the second control signal 552 for coupler-mediated interactions through the coupling elements 516, enables precise gate activation, reduces crosstalk, and preserves the integrity of stored quantum information across the all-fluxonium chain.

In operation, the alternating pattern of data qubit frequencies ød and coupler qubit frequencies ωc along the chain can provide a spectral "addressing map" in which only targeted qubits respond to specific control signals. This pattern can reduce unintended activation and leakage into higher energy levels, supports reliable ancilla readout in error-correction routines, and enables scaling of the architecture to longer chains while maintaining precise frequency role separation. Furthermore, after configuring an all-fluxonium qubit system, some embodiments can perform similar operations described elsewhere in this disclosure to perform error correction operations or other quantum computing operations, where operations that once used transmon ancilla qubits would use fluxonium coupler qubits instead.

In some embodiments, the set of fluxonium data qubits 504 and the set of fluxonium coupler qubits 508 are physically and logically arranged to implement a repetition code for quantum error correction. The set of fluxonium data qubits 504 can store the encoded logical state, while the set of fluxonium coupler qubits 508 can be positioned between the data qubits to enable parity checks through the coupling elements 516. The repetition code encoding can be configured for either bit-flip protection, in which all physical qubits representing the logical state are aligned along the Z-basis, or phase-flip protection, in which they are aligned along the X-basis. Gate operations between fluxonium data qubits of the set of fluxonium data qubits 504 and the set of fluxonium coupler qubits 508, performed by driving the coupler qubits at their transition frequency using the second control signal 552, allow extraction of error syndromes that indicate whether a bit-flip or phase-flip error has occurred. This arrangement leverages the long coherence times of fluxonium devices to reduce the physical error rate within the code cycle, potentially lowering the number of redundancy qubits required compared to prior superconducting architectures using only transmon devices.

In some embodiments, at least one fluxonium coupler qubit of the set of fluxonium coupler qubits 508 is further configured to serve as an ancilla qubit for error-syndrome extraction. In this configuration, a coupler qubit of the set of fluxonium coupler qubits 508 is prepared in a known basis state, interacts with its neighboring fluxonium data qubits of the set of fluxonium data qubits 504 via the coupling elements 516 to entangle and acquire error information, and is subsequently measured by the readout subsystem 528 to determine the syndrome without collapsing the states of the set of fluxonium data qubits 504. Using the a fluxonium coupler qubit as both an interaction mediator for gate operations and as an ancilla for syndrome extraction can reduces the total number of physical qubits required for a given error-correction protocol and simplifies the physical layout by avoiding separate ancilla lines. The spectral isolation between the ancilla-coupler frequency and the data qubit frequency ensures that the measurement process performed by the readout subsystem 528 does not perturb the encoded data state.

In some embodiments, each fluxonium data qubit of the set of fluxonium data qubits 504 is fabricated with an inductive element having an inductance greater than 300 nanohenries to improve the energy relaxation time. This inductance can be realized by fabricating a high-impedance superinductor from a granular aluminum film or an array of series Josephson junctions with junction critical currents tailored to achieve the target inductance. Devices having inductances above this value have demonstrated energy relaxation times exceeding two hundred microseconds in certain operating regimes, thereby providing stability for quantum information storage over extended gate sequences and during multi-round error correction cycles. The high inductance also reduces susceptibility to charge noise, further contributing to a lower decoherence rate in the set of fluxonium data qubits 504.

Some embodiments can further incorporate adaptive control logic within the control subsystem 512 that tunes the transition frequency of a fluxonium coupler qubit of the set of fluxonium coupler qubits based on prior measurement outcomes. For example, if a readout performed by the readout subsystem 528 indicates drift, coupling imbalance, or qubit frequency shift outside a predetermined tolerance, the control subsystem 512 can adjust the flux bias delivered to the coupler's integrated tuning line to bring its transition frequency back into optimal separation from the adjacent fluxonium data qubits of the set of fluxonium data qubits 504. Such adjustments can be performed in real-time between gate executions by modifying the second control signal 552, enabling compensation for slow environmental drift and maintaining high-fidelity gate performance through the coupling elements 516 across successive computational cycles. This adaptive tuning approach is particularly effective in long chains where frequency uniformity contributes directly to minimal crosstalk and stable operation.

Additional Qubit Operations

Some embodiments can perform operations to optimize implementations of a hybrid system or all-fluxonium system. A quantum error correction (QEC) system can include a plurality of fluxonium qubits configured as data qubits, and a plurality of ancilla qubits implemented as transmon qubits. The data qubits store quantum information, while the ancilla qubits perform non-demolition syndrome extraction to identify error states without collapsing the state of the logical qubit. These two qubit modalities are interconnected by coupling elements that enable intentional quantum interactions between selected qubit pairs while suppressing undesired crosstalk to non-target qubits in the architecture.

In one method of operation, each data qubit is coupled to a corresponding ancilla qubit via a resonator-mediated coupling circuit engineered with parameters unique to the fluxonium-transmon combination. The resonator's center frequency is aligned to a target computational transition in the fluxonium qubit and deliberately detuned from transitions in the ancilla qubit that are not involved in the intended gate operation. The resonator quality factor is selected to permit rapid energy exchange sufficient for fast syndrome extraction while suppressing residual excitation that can persist into subsequent operations. Coupling strength is tuned to achieve the desired gate time for controlled quantum operations while maintaining isolation between non-target qubits in the chain. Frequency spacing between the resonator mode and adjacent qubit transitions is configured so that off-resonant interactions are minimized. By employing these engineering parameters, the selective coupling confines the interaction to the intended qubits, reducing correlated error events originating from stray coupling pathways.

In another method of operation, spectrally-shaped microwave control pulses are applied to perform gate operations on a target fluxonium qubit without disturbing other fluxonium qubits that are coupled through a shared ancilla qubit. Each pulse is constructed with a spectral profile concentrated at the transition frequency of the target qubit, with rise and fall characteristics designed to minimize sideband excitations that could interact with non-target qubits. The duration of the pulse is selected to complete the intended transition in the target qubit while avoiding resonant buildup within the shared ancilla's modes. This pulse shaping accounts for the unique multi-level energy structure of fluxonium qubits and the coupling topology mediated by transmon ancillas. By suppressing off-resonant excitations, the system reduces correlated multi-qubit errors and improves gate fidelity within extended qubit chains.

A further method is directed to adaptive syndrome extraction specifically tuned for noise characteristics in fluxonium qubits. The system measures the ancilla qubits following controlled interactions to obtain parity information that indirectly reflects the state of the data qubits. The extracted syndrome data is analyzed to identify dominant noise sources in the fluxonium qubits, such as dephasing rates or low-frequency flux drift. Based on this analysis, the error correction protocol is updated in subsequent cycles by adjusting parameters such as gate timing offsets, coupling strengths in the resonator-mediated circuits, and measurement bases applied to the ancilla qubits. This adaptation maintains logical fidelity over extended run times by compensating for device drift and changing environmental conditions without requiring offline recalibration.

In certain embodiments, the selective coupling operation, the shaped-pulse control operation, and the adaptive syndrome extraction procedure are executed as an integrated sequence. The resonator-mediated coupling is established with engineered parameters specific to the fluxonium-transmon implementation. Gate operations are performed using spectrally-shaped pulses that suppress unwanted transitions in non-target qubits. Syndrome extraction is carried out, followed by adaptive updates to operational parameters before initiating the next correction cycle. This coordinated sequence minimizes the total cycle time of the error correction process and reduces cumulative decoherence effects. As a result, the system achieves higher efficiency and improved logical qubit fidelity compared to conventional homogeneous qubit architectures using standard QEC protocols.

FIG. 6 shows a flowchart of a process 600 to implement hardware-efficient quantum error correction in a fluxonium-transmon architecture, in accordance with one or more embodiments. It should be understood that operations described for a fluxonium-transmon architecture are applicable to fluxonium-fluxonium architecture that have been configured to use both fluxonium qubits for both data and ancilla purposes.

Some embodiments can initialize the quantum error correction cycle by preparing fluxonium data qubits with encoded logical states and transmon ancilla qubits in defined quantum superposition states, as indicated by block 604. In this operation, the system activates control hardware to set fluxonium qubits into their designated logical basis (e.g., $|0\rangle_1$ or $|+\rangle_1$ depending on bit-flip or phase-flip protection mode) and transmon ancilla qubits into a specific superposition state such as $|+\rangle$ for parity checks. For example, in one embodiment, fluxonium data qubits are tuned via flux bias lines to a $|0\rangle \rightarrow |1\rangle$ transition frequency of 0.5 GHz, while transmon ancilla qubits are prepared at 6.2 GHz, ensuring frequency separation that minimizes initial crosstalk. This preparation phase can last 2 to 5 μs depending on calibration routines and is verified through pre-cycle check pulses to confirm proper state initialization.

Some embodiments can generate spectrally-shaped microwave pulses centered on the target fluxonium transition frequency with rise and fall profiles suppressing sidebands and preventing population changes in non-target qubits, as indicated by block 612. The control pulses are shaped using envelopes such as Gaussian or DRAG (Derivative Removal by Adiabatic Gate) profiles to restrict spectral leakage. In one example, a Gaussian-enveloped pulse with FWHM of 5 MHz is centered at 0.5 GHz for a target fluxonium qubit, with rise and fall times of 20 ns and amplitude control to deliver a π-rotation in 180 ns. Spectral sidebands are reduced to −40 dB relative to the carrier, which experimental measurements confirm limits neighboring qubit excitation probability to <0.2%. This pulse shaping prevents correlated multi-qubit errors that degrade error correction performance.

Some embodiments can execute controlled quantum operations between fluxonium data qubits and transmon ancilla qubits, then measure the ancilla qubits to obtain non-destructive parity information, as indicated by block 616. The system can apply a sequence of controlled-Z gates where the control is a fluxonium qubit and the target is a transmon ancilla qubit, causing the ancilla state to be conditioned on the parity of two or more data qubits. For example, two fluxonium qubits at 0.5 GHz and 0.55 GHz can be coupled to a 6.2 GHz transmon, with controlled-Z gates of ~200 ns implemented. The ancilla is measured in the X-basis using a dedicated readout resonator at 7.5 GHz. This indirect measurement method preserves the stored quantum data while revealing syndrome values for error correction.

Some embodiments can process the measured syndrome data to detect fluxonium noise characteristics and determine whether operational protocol adjustments are required before the next cycle, as indicated by block 620. Low-latency processing hardware such as an FPGA analyzes syndrome trends over multiple cycles, looking for indicators such as a dephasing time $T_2$ drop. In one example, the system detects a decline in $T_2$ from 120 μs to 85 μs within 10 minutes, indicating increased phase noise. The processor compares syndrome patterns against predefined thresholds, and if noise exceeds these limits (e.g., error rate $>1\times10^{-3}$ per cycle) marks the cycle for adaptation protocols. If no concerning noise patterns are detected, the process can proceed without adjustment.

Some embodiments can adjust operational parameters including gate timing offsets, resonator coupling strengths, and ancilla measurement basis, and store the updated control sequences for application in subsequent cycles, as indicated by block 624. Adaptive control software modifies gate timing in increments of 5 ns to re-align with shifted resonance conditions, tunes resonator coupling strengths by ±1 MHz via on-chip flux control lines, and can change the ancilla measurement basis from X to Z when phase noise dominates over amplitude noise. For example, when drift causes a resonator's actual frequency to shift by 3 MHz, the software updates both pulse shaping parameters and bias settings within 200 μs, storing the adapted schedule for future cycles. These adjustments help maintain logical fidelity above 99% despite device drift.

Some embodiments can generate corrective gate operations based on processed syndrome outcomes and apply the corrective gates to the fluxonium data qubits, as indicated by block 628. Correction can involve single-qubit X or Z gates, or combinations thereof, applied to restore the encoded logical state. In one embodiment, a detected phase error in the second fluxonium qubit is corrected with a Z-rotation pulse of 180°, 160 ns duration, centered at 0.5 GHz with amplitude tuned for minimal overshoot. Execution time from syndrome detection to corrective gate application is kept under 1 μs to minimize additional decoherence exposure.

Some embodiments can terminate the current error correction cycle and prepare the system for the next operational iteration, as indicated by block 632. The termination step can include resetting ancilla qubits to $|0\rangle$ or $|+\rangle$ states, clearing residual excitations from resonators by passive decay or active reset pulses, and verifying data qubit states through a non-demolition parity check. For example, after correction gates are applied, ancilla reset pulses of 50 ns duration can bring each transmon back to its ground state, with residual populations measured to be below 0.5%. The system then signals readiness for the subsequent QEC cycle, ensuring continuous protection of logical qubits.

The above-described embodiments of the present disclosure are presented for purposes of illustration and not of limitation, and the present disclosure is limited only by the claims which follow. Furthermore, it should be noted that the features and limitations described in any embodiment can be applied to one or more other embodiments herein, and flowcharts or examples relating to one embodiment can be combined with any other embodiment in a suitable manner, done in different orders, or done in parallel. In addition, the systems and methods described herein can be performed in real time. It should also be noted that the systems and/or methods described above can be applied to, or used in accordance with, other systems and/or methods. Furthermore, not all operations of a flowchart need to be performed.

Furthermore, the computing devices described in this disclosure can be any type of computing device unless otherwise stated, including, but not limited to, a laptop computer, a tablet computer, a hand-held computer, and/or other computing equipment (e.g., a server), including "smart," wireless, wearable, and/or mobile devices. Furthermore, the embodiments described in this disclosure can include an individual device that performs some or all the operations described in this disclosure. Alternatively, other embodiments can include multiple computing devices acting collectively to perform some or all the operations described in this disclosure.

In some embodiments, the operations described in this disclosure can be implemented in a set of processing devices (e.g., a digital processor, an analog processor, a digital circuit designed to process information, an analog circuit designed to process information, a state machine, and/or other mechanisms for electronically processing information). The processing devices can include one or more devices executing some or all of the operations of the methods in response to instructions stored electronically on one or more non-transitory, machine-readable media (e.g., a set of machine-readable storage media), such as an electronic storage medium. Furthermore, the use of the term "media" can include a single medium or combination of multiple media, such as a first medium and a second medium. One or more non-transitory machine-readable media storing instructions can include instructions included on a single medium or instructions distributed across multiple media. For example, non-transitory media can act as one or more memory, where one or more memory can store program instructions that are written as source files or written in machine-executable program code. The processing devices can include one or more devices configured through hardware, firmware, and/or software to be specifically designed for the execution of one or more of the operations of the methods.

In some embodiments, the various computer systems and subsystems illustrated in FIG. 1 or other figures described in this disclosure can include one or more computing devices that are programmed to perform the functions described herein. The computing devices can include one or more electronic storages (e.g., a set of databases accessible to one or more applications depicted in the system 100), one or more physical processors programmed with one or more computer program instructions, and/or other components. For example, the set of databases can include one or more relational databases. Alternatively, or additionally, the set of databases or other electronic storage used in this disclosure can include one or more non-relational databases.

The computing devices can include communication lines or ports to enable the exchange of information with a set of networks (e.g., a network used by the system 100) or other computing platforms via wired or wireless techniques. The network can include the internet, a mobile phone network, a mobile voice or data network (e.g., a 5G or Long-Term Evolution (LTE) network), a cable network, a public switched telephone network, or other types of communication networks or combination of communication networks. A network described by devices or systems described in this disclosure can include one or more communications paths, such as Ethernet, a satellite path, a fiber-optic path, a cable path, a path that supports internet communications (e.g., IPTV), free-space connections (e.g., for broadcast or other wireless signals), Wi-Fi, Bluetooth, near field communication, or any other suitable wired or wireless communications path or combination of such paths. The computing devices can include additional communication paths linking a plurality of hardware, software, and/or firmware components operating together. For example, the computing devices can be implemented by a cloud of computing platforms operating together as the computing devices.

Each of these devices described in this disclosure can also include electronic storages. The electronic storage can include one or more non-transitory machine-readable media (e.g., storage media) that electronically store information. The storage media of the electronic storages can include one or both of (i) system storage that is provided integrally (e.g., substantially non-removable) with servers or client computing devices, or (ii) removable storage that is removably connectable to the servers or client computing devices via port (e.g., a USB port, a firewire port, etc.) or drive (e.g., a disk drive, etc.). The electronic storages can include one or more optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages can include one or more virtual storage resources (e.g., cloud storage, a virtual private network, and/or other virtual storage resources). An electronic storage can store software algorithms, information determined by the processors, information obtained from servers, information obtained from client computing devices, or other information that enables the functionality as described herein.

The processors can be programmed to provide information processing capabilities in the computing devices. As such, the processors can include one or more of a digital processor, an analog processor, a digital circuit designed to process information, an analog circuit designed to process information, a state machine, and/or other mechanisms for electronically processing information. In some embodiments, the processors can include a plurality of processing units. These processing units can be physically located within the same device, or the processors can represent the processing functionality of a plurality of devices operating in coordination. The processors can be programmed to execute computer program instructions to perform functions described herein of subsystems described in this disclosure or other subsystems. The processors can be programmed to execute computer program instructions by software; hardware; firmware; some combination of software, hardware, or firmware; and/or other mechanisms for configuring processing capabilities on the processors.

It should be appreciated that the description of the functionality provided by the different subsystems described herein is for illustrative purposes, and is not intended to be limiting, as any of the subsystems described in this disclosure can provide more or less functionality than is described. For example, one or more of subsystems described in this disclosure can be eliminated, and some or all of its functionality can be provided by other ones of subsystems described in this disclosure. As another example, additional subsystems can be programmed to perform some, or all of the functionality attributed herein to one of the subsystems described in this disclosure.

With respect to the components of computing devices described in this disclosure, each of these devices can receive content and data via input/output (I/O) paths. Each of these devices can also include processors and/or control circuitry to send and receive commands, requests, and other suitable data using the I/O paths. The control circuitry can comprise any suitable processing, storage, and/or I/O circuitry. Further, some or all of the computing devices described in this disclosure can include a user input interface and/or user output interface (e.g., a display) for use in receiving and displaying data. In some embodiments, a display such as a touchscreen can also act as a user input interface. It should be noted that in some embodiments, one or more devices described in this disclosure can have neither user input interface nor displays and can instead receive and display content using another device (e.g., a dedicated display device, such as a computer screen, and/or a dedicated input device, such as a remote control, mouse, voice input, etc.). Additionally, one or more of the devices described in this disclosure can run an application (or another suitable program) that performs one or more operations described in this disclosure.

Although the present invention has been described in detail for the purpose of illustration based on what is currently considered to be the most practical and preferred embodiments, it is to be understood that such detail is solely for that purpose and that the invention is not limited to the disclosed embodiments but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

As used throughout this application, the word "can" is used in a permissive sense (i.e., meaning having the potential to), rather than a mandatory sense (i.e., meaning must). The words "include," "including," "includes," and the like mean including, but not limited to. As used throughout this application, the singular forms "a," "an," and "the" include plural referents unless the context clearly indicates otherwise. Thus, for example, reference to "an element" or "the element" includes a combination of two or more elements, notwithstanding the use of other terms and phrases for one or more elements, such as "one or more." The term "or" is non-exclusive (i.e., encompassing both "and" and "or"), unless the context clearly indicates otherwise. Terms describing conditional relationships (e.g., "in response to X, Y," "upon X, Y," "if X, Y," "when X, Y," and the like) encompass causal relationships in which the antecedent is a necessary causal condition, the antecedent is a sufficient causal condition, or the antecedent is a contributory causal condition of the consequent (e.g., "state X occurs upon condition Y obtaining" is generic to "X occurs solely upon Y" and "X occurs upon Y and Z"). Such conditional relationships are not limited to consequences that instantly follow the antecedent obtaining, as some consequences can be delayed, and in conditional statements, antecedents are connected to their consequents (e.g., the antecedent is relevant to the likelihood of the consequent occurring). Statements in which a plurality of attributes or functions are mapped to a plurality of objects (e.g., a set of processors performing steps/operations A, B, C, and D) encompass all such attributes or functions being mapped to all such objects and subsets of the attributes or functions being mapped to subsets of the attributes or functions (e.g., both/all processors each performing steps/operations A-D, and a case in which processor 1 performs step/operation A, processor 2 performs step/operation B and part of step/operation C, and processor 3 performs part of step/operation C and step/ operation D), unless otherwise indicated. Further, unless otherwise indicated, statements that one value or action is "based on" another condition or value encompass both instances in which the condition or value is the sole factor and instances in which the condition or value is one factor among a plurality of factors.

Unless the context clearly indicates otherwise, statements that "each" instance of some collection has some property should not be read to exclude cases where some otherwise identical or similar members of a larger collection do not have the property (i.e., each does not necessarily mean each and every). Limitations as to the sequence of recited steps should not be read into the claims unless explicitly specified (e.g., with explicit language like "after performing X, performing Y") in contrast to statements that might be improperly argued to imply sequence limitations (e.g., "performing X on items, performing Y on the X'ed items") used for purposes of making claims more readable rather than specifying a sequence. Statements referring to "at least Z of A, B, and C," and the like (e.g., "at least Z of A, B, or C"), refer to at least Z of the listed categories (A, B, and C) and do not require at least Z units in each category. Unless the context clearly indicates otherwise, it is appreciated that throughout this specification discussions utilizing terms such as "processing," "computing," "calculating," "determining," or the like refer to actions or processes of a specific apparatus, such as a special purpose computer or a similar special purpose electronic processing/computing device. Furthermore, unless indicated otherwise, updating an item can include generating the item or modifying an existing item. Thus, updating a record can include generating a record or modifying the value of an already-generated value in a record. Additionally, as used in the specification, "a portion" refers to a part of, or the entirety of (i.e., the entire portion), a given item (e.g., data) unless the context clearly dictates otherwise.

Unless the context clearly indicates otherwise, ordinal numbers used to denote an item do not define the item's position. For example, an item that can be a first item of a set of items even if the item is not the first item to have been added to the set of items or is otherwise indicated to be listed as the first item of an ordering of the set of items. Thus, for example, if a set of items is sorted in a sequence from "item 1," "item 2," and "item 3," the first item of a set of items can be "item 2" unless otherwise stated. Furthermore, a "set" can refer to a singular form or a plural form, such that a "set of items" can refer to one item or a plurality of items.

Enumerated Embodiments

The present techniques will be better understood with reference to the following enumerated clauses:

A1. A system comprising: a plurality of fluxonium qubits arranged as data qubits; a plurality of transmon qubits arranged as ancilla qubits, wherein, for a first transmon qubit of the plurality of transmon qubits: the first transmon qubit is positioned between a first fluxonium qubit of the plurality of fluxonium qubits and a second fluxonium qubit of the plurality of fluxonium qubits, the first transmon qubit comprises a readout resonator and a coupling element connected between the first fluxonium qubit and the second fluxonium qubit.

A2. A system comprising: a plurality of fluxonium qubits arranged as data qubits; a plurality of transmon qubits arranged as ancilla qubits, wherein, for a first transmon qubit of the plurality of transmon qubits: the first transmon qubit is positioned between a first fluxonium qubit of the plurality of fluxonium qubits and a second fluxonium qubit of the plurality of fluxonium qubits, the first transmon qubit comprises a readout resonator and a tunable coupling element connected between the first fluxonium qubit and the second fluxonium qubit, and the tunable coupling element is connected to a coupling control circuit that (1) controls a coupling strength between the first fluxonium qubit and the second fluxonium qubit and (2) increases an impedance state of the tunable coupling element during an idle period between the first fluxonium qubit and the second fluxonium qubit.

A3. A system comprising: a plurality of fluxonium qubits arranged as data qubits for storing quantum information; a plurality of transmon qubits arranged as ancilla qubits, wherein, for each respective transmon qubit of the plurality of transmon qubits: the respective transmon qubit is positioned between a respective first fluxonium qubit of the plurality of fluxonium qubits and a respective second fluxonium qubit of the plurality of fluxonium qubits, the respective transmon qubit comprises a respective tunable coupling element connected between the respective first fluxonium qubit and the respective second fluxonium qubit, and the respective tunable coupling element is connected to a respective coupling control circuit that (1) controls a coupling strength between the respective first fluxonium qubit and the respective second fluxonium qubit and (2) increases an impedance state of the respective tunable coupling element during an idle period between the respective first fluxonium qubit and the respective second fluxonium qubit to isolate the plurality of fluxonium qubits from residual interactions during the idle period.

A4. The system of any of the embodiments described above, wherein the respective coupling control circuit comprises a flux bias line applying a magnetic flux to the respective tunable coupling element to switch the respective tunable coupling element to a high impedance state during the idle period.

A5. The system of any of the embodiments described above, further comprising a control processor connected to the respective coupling control circuit, the control processor executing stored control instructions to adjust activation timing of the respective tunable coupling element based on prior measurement outcomes obtained from the respective transmon qubit.

A6. A system of any of the embodiments described above, wherein the plurality of fluxonium qubits and the plurality of transmon qubits are arranged in a linear chain implementing a repetition code, wherein each respective transmon qubit of the plurality of transmon qubits is positioned between respective fluxonium qubit pairs and comprises both a respective tunable coupling element and a respective readout resonator for syndrome extraction.

A7. A system of any of the embodiments described above, further comprising a control processor connected to the coupling control circuit, the control processor executing stored control instructions to adjust activation timing of the tunable coupling element based on prior measurement outcomes obtained from the first transmon qubit.

A8. A system of any of the embodiments described above, wherein the tunable coupling element comprises a resonator having a first port connected to the first fluxonium qubit and a second port connected to the second fluxonium qubit.

A9. A system of any of the embodiments described above, wherein the coupling control circuit comprises a flux bias line magnetically coupled to the tunable coupling element, and wherein the flux bias line causes a magnetic flux increase that increases the impedance state of the tunable coupling element during the idle period.

A10. A system of any of the embodiments described above, wherein the first fluxonium qubit, the first transmon qubit, and the second fluxonium qubit share a common substrate.

A11. A system of any of the embodiments described above, wherein the plurality of fluxonium qubits and the plurality of transmon qubits are arranged in a grid implementing a rotated surface code, the plurality of transmon qubits positioned at vertex locations of the grid.

A12. A system of any of the embodiments described above, further comprising a second transmon qubit that is positioned between the second fluxonium qubit and a third fluxonium qubit of the plurality of fluxonium qubits, wherein the second transmon qubit comprises a readout wherein the second transmon qubit comprises a second tunable coupling element that is connected to a second coupling control circuit that (1) controls a coupling strength between the second fluxonium qubit and the third fluxonium qubit and (2) increases an impedance state of the second tunable coupling element during an idle period between the second fluxonium qubit and the third fluxonium qubit.

A13. A system of any of the embodiments described above, wherein the plurality of fluxonium qubits comprise high inductance elements formed using nanowire arrays or superinductors, and the plurality of transmon qubits comprise multi junction elements, wherein the plurality of fluxonium qubits and the plurality of transmon qubits are co fabricated on a common substrate using a multi layer aluminum deposition process with controlled oxidation to define Josephson junctions for both qubit types in a single lithography mask set.

A14. A method comprising: adjusting, by a coupling control circuit connected to a tunable coupling element of a first transmon qubit of a plurality of transmon qubits arranged as ancilla qubits, a coupling strength between a first fluxonium qubit and a second fluxonium qubit during a quantum error correction cycle, wherein a plurality of fluxonium qubits arranged as data qubits comprises the first fluxonium qubit and the second fluxonium qubit; in response to an idle period between the first fluxonium qubit and the second fluxonium qubit, increasing an impedance state of the tunable coupling element; measuring a state of the first transmon qubit by transmitting a readout signal to a dedicated readout resonator coupled to the first transmon qubit and detecting the response of the dedicated readout resonator in a predetermined basis to obtain syndrome information; and applying correction operations to one or more qubits of the plurality of fluxonium qubits based on the syndrome information.

A15. A method of any of the embodiments described above, wherein measuring the first transmon qubit comprises adjusting a measurement timing or measurement basis based on additional syndrome information that is previously obtained from the plurality of transmon qubits.

A16. A method of any of the embodiments described above, wherein adjusting the coupling strength comprises tuning a resonator element disposed between the first fluxonium qubit and the second fluxonium qubit, the resonator element having a first port connected to the first fluxonium qubit and a second port connected to the second fluxonium qubit through the tunable coupling element of the first transmon qubit.

A17. A method of any of the embodiments described above, wherein adjusting the coupling strength comprises supplying a flux bias signal via the coupling control circuit to vary an effective inductance of the tunable coupling element.

A18. A method of any of the embodiments described above, further comprising, prior to the idle period, precharging the tunable coupling element to an increased impedance state to reduce crosstalk between the first fluxonium qubit and the second fluxonium qubit.

A19. A method of any of the embodiments described above, wherein the predetermined basis is an X-basis, further comprising: initializing the first transmon qubit in the X basis; performing an entangling controlled-NOT gate operation by transmitting control pulses to the first fluxonium qubit and the first transmon qubit through the coupling control circuit; and measuring the first transmon qubit in the X basis to obtain the syndrome information.

A20. A method of any of the embodiments described above, wherein the plurality of fluxonium qubits and the plurality of transmon qubits are operated according to a rotated surface code error correction cycle, wherein the plurality of transmon qubits are positioned at vertex locations of a two-dimensional lattice.

A21. A method of any of the embodiments described above, further comprising: deactivating the tunable coupling elements between non-target fluxonium qubit pairs; and executing a quantum gate operation on a target fluxonium qubit pair in a chain arrangement after the deactivating of the tunable coupling elements.

A22. A tangible, non-transitory, machine-readable medium storing instructions that, when executed by a data processing apparatus, cause the data processing apparatus to perform operations comprising those of any of embodiments A14-A21.

A23. A system comprising one or more processors; and memory storing instructions that, when executed by the processors, cause the processors to effectuate operations comprising those of any of embodiments A14-A21.

A24. A system comprising means for performing any of embodiments A14-A21.

Additional Enumerated Embodiments

B1. A quantum processing system comprising: a set of fluxonium data qubits physically arranged in a chain and configured to store quantum information; a set of fluxonium coupler qubits positioned between respective pairs of adjacent fluxonium data qubits; a control subsystem configured to assign a transition frequency to each fluxonium coupler qubit that is distinct from and spectrally separated relative to transition frequencies assigned to the adjacent fluxonium data qubits; a coupling subsystem configured to enable quantum gate operations between adjacent fluxonium data qubits by activating an interaction pathway through a fluxonium coupler qubit based on a control signal at the transition frequency of the fluxonium coupler qubit; and a readout subsystem configured to measure a selected fluxonium coupler qubit.

B2. A system of any of the embodiments above, wherein the transition frequency of each fluxonium coupler qubit is distinct from and spectrally separated relative to the transition frequencies of the adjacent fluxonium data qubits, arranged in an alternating pattern along the chain.

B3. A system of any of the embodiments above, wherein a spectral separation between the transition frequencies of the adjacent fluxonium data qubits and the transition frequency of a fluxonium coupler qubit that is adjacent to the adjacent fluxonium data qubits is between 50 megahertz and 250 megahertz.

B4. A system of any of the embodiments above, wherein the coupling subsystem is configured to implement a controlled-Z or a controlled-NOT gate between two fluxonium data qubits when the selected fluxonium coupler qubit is driven at its transition frequency.

B5. A system of any of the embodiments above, wherein the readout subsystem performs a non-demolition measurement using a dispersive readout resonator tuned to the transition frequency of the fluxonium coupler qubit.

B6. A system of any of the embodiments above, wherein the coupling subsystem comprises resonator-mediated links, inductive links, or capacitive links between each fluxonium coupler qubit and the adjacent fluxonium data qubits.

B7. A system of any of the embodiments above, wherein the control subsystem generates a first control signal tuned to a fluxonium data qubit transition frequency and a second control signal tuned to a fluxonium coupler qubit transition frequency, the first control signal being used for data qubit operations and the second control signal being used for coupler-mediated operations.

B8. A method comprising: providing a set of fluxonium data qubits physically arranged in a chain and configured to store quantum information; providing a set of fluxonium coupler qubits positioned between respective pairs of adjacent fluxonium data qubits; tuning each fluxonium coupler qubit to a transition frequency that is distinct from and spectrally separated relative to transition frequencies of the adjacent fluxonium data qubits; receiving a control signal at the transition frequency of a selected fluxonium coupler qubit; activating a quantum gate operation between the adjacent fluxonium data qubits by enabling an interaction pathway through the selected fluxonium coupler qubit in response to the control signal; and measuring the selected fluxonium coupler qubit while preserving a quantum state of the adjacent fluxonium data qubits.

C1. A method comprising: receiving quantum information in a plurality of fluxonium qubits arranged as data qubits; coupling each respective fluxonium qubit to at least one respective ancilla qubit of a plurality of ancilla qubits through at least one selective coupling element configured to reduce crosstalk between the respective fluxonium qubit and the at least one respective ancilla qubit; initializing the plurality of ancilla qubits in a defined quantum state; applying at least one control signal to perform controlled quantum operations between each respective fluxonium qubits and a respective adjacent ancilla qubit; measuring the plurality of ancilla qubits in a selected basis to extract a syndrome data set without performing direct measurement on the plurality of fluxonium qubits; processing the syndrome data set by low-latency processing hardware to determine a corrective operation; and transmitting the corrective operation to the plurality of fluxonium qubits.

C2. A method of any of the embodiments above, wherein each selective coupling element comprises a resonator-mediated coupling circuit tuned to an interaction frequency matched to a transition in at least one qubit of the plurality of fluxonium qubits and detuned from a non-target transition in one or more qubits of the plurality of ancilla qubits, a resonator of the resonator-mediated coupling circuit having a quality factor selected to enable rapid syndrome extraction while suppressing residual excitation.

C3. A method of any of the embodiments above, wherein applying the at least one control signal comprises generating a spectrally-shaped microwave pulse configured to perform a gate operation on a target fluxonium qubit coupled through a shared ancilla qubit while suppressing population changes in a non-target fluxonium qubit.

C4. A method of any of the embodiments above, further comprising adjusting at least one of the at least one control signal, a coupling parameter of the at least one selective coupling element, or a measurement basis for at least one qubit of the plurality of ancilla qubits in response to noise characteristics detected in the syndrome data set from the plurality of fluxonium qubits.

C5. A method of any of the embodiments above, further comprising adjusting at least one operational parameter of the syndrome extraction circuit, including the at least one control signal, a coupling parameter of the at least one selective coupling element, or a measurement basis for one of the ancilla qubits, in response to noise characteristics detected in the syndrome data set from the plurality of fluxonium qubits to optimize the quantum error correction process for specific noise characteristics of the device.

What is claimed is:

1. A system for quantum error correction, the system comprising:

a plurality of fluxonium qubits arranged as data qubits for storing quantum information;

a plurality of transmon qubits arranged as ancilla qubits, wherein the plurality of fluxonium qubits and the plurality of transmon qubits are arranged in a grid implementing a rotated surface code, the plurality of transmon qubits positioned at vertex locations of the grid, and wherein, for each respective transmon qubit of the plurality of transmon qubits:

the respective transmon qubit is positioned between a respective first fluxonium qubit of the plurality of fluxonium qubits and a respective second fluxonium qubit of the plurality of fluxonium qubits, the respective transmon qubit comprises a respective tunable coupling element connected between the respective first fluxonium qubit and the respective second fluxonium qubit, and the respective tunable coupling element is connected to a respective coupling control circuit that (1) controls a coupling strength between the respective first fluxonium qubit and the respective second fluxonium qubit and (2) increases an impedance state of the respective tunable coupling element during an idle period between the respective first fluxonium qubit and the respective second fluxonium qubit to isolate the plurality of fluxonium qubits from residual interactions during the idle period.

2. The system of claim 1, wherein the respective coupling control circuit comprises a flux bias line applying a magnetic flux to the respective tunable coupling element to switch the respective tunable coupling element to a high-impedance state during the idle period.

3. The system of claim 1, further comprising a control processor connected to the respective coupling control circuit, the control processor executing stored control instructions to adjust activation timing of the respective tunable coupling element based on prior measurement outcomes obtained from the respective transmon qubit.

4. A system for quantum error correction, the system comprising:

a plurality of fluxonium qubits arranged as data qubits;

a plurality of transmon qubits arranged as ancilla qubits, wherein the plurality of fluxonium qubits and the plurality of transmon qubits are arranged in a grid implementing a rotated surface code, the plurality of transmon qubits positioned at vertex locations of the grid, and wherein, for a first transmon qubit of the plurality of transmon qubits:

the first transmon qubit is positioned between a first fluxonium qubit of the plurality of fluxonium qubits and a second fluxonium qubit of the plurality of fluxonium qubits, the first transmon qubit comprises a readout resonator and a tunable coupling element connected between the first fluxonium qubit and the second fluxonium qubit, and the tunable coupling element is connected to a coupling control circuit that (1) controls a coupling strength between the first fluxonium qubit and the second fluxonium qubit and (2) increases an impedance state of the tunable coupling element during an idle period between the first fluxonium qubit and the second fluxonium qubit.

5. The system of claim 4, wherein the plurality of fluxonium qubits and the plurality of transmon qubits are arranged in a linear chain implementing a repetition code, wherein each respective transmon qubit of the plurality of transmon qubits is positioned between respective fluxonium qubit pairs and comprises both a respective tunable coupling element and a respective readout resonator for syndrome extraction.

6. The system of claim 4, further comprising a control processor connected to the coupling control circuit, the control processor executing stored control instructions to adjust activation timing of the tunable coupling element based on prior measurement outcomes obtained from the first transmon qubit.

7. The system of claim 4, wherein the tunable coupling element comprises a resonator having a first port connected to the first fluxonium qubit and a second port connected to the second fluxonium qubit.

8. The system of claim 4, wherein the coupling control circuit comprises a flux bias line magnetically coupled to the tunable coupling element, and wherein the flux bias line causes a magnetic flux increase that increases the impedance state of the tunable coupling element during the idle period.

9. The system of claim 4, wherein the first fluxonium qubit, the first transmon qubit, and the second fluxonium qubit share a common substrate.

10. The system of claim 4, further comprising a second transmon qubit that is positioned between the second fluxonium qubit and a third fluxonium qubit of the plurality of fluxonium qubits, wherein the second transmon qubit comprises a readout wherein the second transmon qubit comprises a second tunable coupling element that is connected to a second coupling control circuit that (1) controls a coupling strength between the second fluxonium qubit and the third fluxonium qubit and (2) increases an impedance state of the second tunable coupling element during an idle period between the second fluxonium qubit and the third fluxonium qubit.

11. A system for quantum error correction, the system comprising:

a plurality of fluxonium qubits arranged as data qubits;

a plurality of transmon qubits arranged as ancilla qubits, wherein, for a first transmon qubit of the plurality of transmon qubits:

the first transmon qubit is positioned between a first fluxonium qubit of the plurality of fluxonium qubits and a second fluxonium qubit of the plurality of fluxonium qubits, the first transmon qubit comprises a readout resonator and a tunable coupling element connected between the first fluxonium qubit and the second fluxonium qubit, and the tunable coupling element is connected to a coupling control circuit that (1) controls a coupling strength between the first fluxonium qubit and the second fluxonium qubit and (2) increases an impedance state of the tunable coupling element during an idle period between the first fluxonium qubit and the second fluxonium qubit, wherein the plurality of fluxonium qubits comprise high-inductance elements formed using nanowire arrays or superinductors, and the plurality of transmon qubits comprise multi-junction elements, wherein the plurality of fluxonium qubits and the plurality of transmon qubits are co-fabricated on a common substrate using a multi-layer aluminum deposition process with controlled oxidation to define Josephson junctions for both qubit types in a single lithography mask set.

12. A method for operating a quantum error correction system, the method comprising:

adjusting, by a coupling control circuit connected to a tunable coupling element of a first transmon qubit of a plurality of transmon qubits arranged as ancilla qubits, a coupling strength between a first fluxonium qubit and a second fluxonium qubit during a quantum error correction cycle, wherein a plurality of fluxonium qubits arranged as data qubits comprises the first fluxonium qubit and the second fluxonium qubit, wherein the plurality of fluxonium qubits and the plurality of transmon qubits are operated according to a rotated surface code error correction cycle, wherein the plurality of transmon qubits are positioned at vertex locations of a two-dimensional lattice;

in response to an idle period between the first fluxonium qubit and the second fluxonium qubit, increasing an impedance state of the tunable coupling element;

measuring a state of the first transmon qubit by transmitting a readout signal to a dedicated readout resonator coupled to the first transmon qubit and detecting the response of the dedicated readout resonator in a predetermined basis to obtain syndrome information; and applying correction operations to one or more qubits of the plurality of fluxonium qubits based on the syndrome information.

13. The method of claim 12, wherein measuring the first transmon qubit comprises adjusting a measurement timing or measurement basis based on additional syndrome information that is previously obtained from the plurality of transmon qubits.

14. The method of claim 12, wherein adjusting the coupling strength comprises tuning a resonator element disposed between the first fluxonium qubit and the second fluxonium qubit, the resonator element having a first port connected to the first fluxonium qubit and a second port connected to the second fluxonium qubit through the tunable coupling element of the first transmon qubit.

15. The method of claim 12, wherein adjusting the coupling strength comprises supplying a flux bias signal via the coupling control circuit to vary an effective inductance of the tunable coupling element.

16. The method of claim 12, further comprising:

deactivating the tunable coupling elements between non-target fluxonium qubit pairs; and executing a quantum gate operation on a target fluxonium qubit pair in a chain arrangement after the deactivating of the tunable coupling elements.

17. A method for operating a quantum error correction system, the method comprising:

adjusting, by a coupling control circuit connected to a tunable coupling element of a first transmon qubit of a plurality of transmon qubits arranged as ancilla qubits, a coupling strength between a first fluxonium qubit and a second fluxonium qubit during a quantum error correction cycle, wherein a plurality of fluxonium qubits arranged as data qubits comprises the first fluxonium qubit and the second fluxonium qubit;

prior to an idle period between the first fluxonium qubit and the second fluxonium qubit, precharging the tunable coupling element to an increased impedance state to reduce crosstalk between the first fluxonium qubit and the second fluxonium qubit;

in response to the idle period between the first fluxonium qubit and the second fluxonium qubit, increasing an impedance state of the tunable coupling element;

measuring a state of the first transmon qubit by transmitting a readout signal to a dedicated readout resonator coupled to the first transmon qubit and detecting the response of the dedicated readout resonator in a predetermined basis to obtain syndrome information;

applying correction operations to one or more qubits of the plurality of fluxonium qubits based on the syndrome information.

18. A method for operating a quantum error correction system, the method comprising:

adjusting, by a coupling control circuit connected to a tunable coupling element of a first transmon qubit of a plurality of transmon qubits arranged as ancilla qubits, a coupling strength between a first fluxonium qubit and a second fluxonium qubit during a quantum error correction cycle, wherein a plurality of fluxonium qubits arranged as data qubits comprises the first fluxonium qubit and the second fluxonium qubit;

in response to an idle period between the first fluxonium qubit and the second fluxonium qubit, increasing an impedance state of the tunable coupling element;

measuring a state of the first transmon qubit by transmitting a readout signal to a dedicated readout resonator coupled to the first transmon qubit and detecting the response of the dedicated readout resonator in a predetermined basis to obtain syndrome information, wherein the predetermined basis is an X-basis, and wherein obtaining the syndrome information comprises:

initializing the first transmon qubit in the X-basis;

performing an entangling controlled-NOT gate operation by transmitting control pulses to the first fluxonium qubit and the first transmon qubit through the coupling control circuit; and measuring the first transmon qubit in the X-basis to obtain the syndrome information; and applying correction operations to one or more qubits of the plurality of fluxonium qubits based on the syndrome information.

* * * * *